United States Patent
Sabi

(10) Patent No.: US 7,457,229 B2
(45) Date of Patent: Nov. 25, 2008

(54) OPTICAL RECORDING MEDIUM

(75) Inventor: Yuichi Sabi, Tokyo (JP)

(73) Assignee: Sony Corporation, Tokyo (JP)

( * ) Notice: Subject to any disclaimer, the term of this patent is extended or adjusted under 35 U.S.C. 154(b) by 622 days.

(21) Appl. No.: 10/473,448

(22) PCT Filed: Jan. 31, 2003

(86) PCT No.: PCT/JP03/01029

§ 371 (c)(1),
(2), (4) Date: Sep. 30, 2003

(87) PCT Pub. No.: WO03/065359

PCT Pub. Date: Aug. 7, 2003

(65) Prior Publication Data

US 2004/0105381 A1 Jun. 3, 2004

(30) Foreign Application Priority Data

Feb. 1, 2002 (JP) ............................... 2002-026124

(51) Int. Cl.
*G11B 3/70* (2006.01)
(52) U.S. Cl. ..................................... 369/288; 369/284
(58) Field of Classification Search ........................ None
See application file for complete search history.

(56) References Cited

U.S. PATENT DOCUMENTS 7,065,035 B1 * 6/2006 Mizuuchi et al. ............ 369/283

FOREIGN PATENT DOCUMENTS

| JP | 09-237438 | * | 9/1997 |
| JP | 9-237438 | | 9/1997 |
| JP | 09237438 A | * | 9/1997 |
| JP | 2001-176129 | * | 6/2001 |
| JP | 2001-236690 | * | 8/2001 |
| JP | 2001-273672 | * | 10/2001 |

* cited by examiner

*Primary Examiner*—Joseph Feild
*Assistant Examiner*—Tawfik Goma
(74) *Attorney, Agent, or Firm*—Oblon, Spivak, McClelland, Maier & Neustadt, P.C.

(57) ABSTRACT

The present invention relates to an optical recording medium having a plurality of recording layers having different uses. The optical recording medium includes a first light transmitting layer (32); a layer (31) composed of an organic dye for recording and reading data by an optical beam of a first wavelength incident through the first light transmitting layer (32) and transmitting an optical beam of a second wavelength incident through the first light transmitting layer (32); a second light transmitting layer (34) for transmitting the optical beam of the second wavelength incident through the layer (31) composed of the organic dye; and a reflecting layer (331) for reflecting the optical beam of the second wavelength incident through the second light transmitting layer (34).

40 Claims, 10 Drawing Sheets

OPTICAL RECORDING MEDIUM

TECHNICAL FIELD

The present invention relates to an optical recording medium having a plurality of recording layers and more particularly to an optical recording medium in which recording layers dedicated for reproducing are appropriately combined with recording layers capable of recording data to laminate a plurality of layers.

The present application claims priority of Japanese Patent application No. 2002-026124, filed in Feb. 1, 2002, the entirety of which is incorporated by reference herein.

BACKGROUND ART

As recording media for recording and reproducing information, various kinds of recording media have been proposed. As for an optical disc of such recording media, optical discs of various standards have been proposed and widely spread depending on various uses.

For example, a CD-DA (Compact Disc Digital Audio) disc is an optical disc on which digital audio data such as music is recorded. A DVD (Digital Versatile Disc)-video disc serves to record digital video data such as videos or images. As optical discs of a new generation, optical discs capable of recording HDTV (High Diffusion Television) data have been studied. The above-described CD-DA discs or the DVD-video discs respectively employ optical beam whose wavelength is 780 nm or 650 nm to reproduce the data thereof. On the other hand, the optical discs of the new generation respectively employ optical beam whose wavelength is, for instance, 400 to 410 nm and an objective lens whose numerical aperture NA is 0.85 to record or reproduce data.

The above-described CD-DA discs have been developed for the purpose of recording the audio data. Then, a standard concerning a CD-ROM disc for recording data that can be processed by a computer is formed. The CD-DA discs and the CD-ROM discs are optical discs dedicated for reproducing. On the other hand, a standard concerning a CD-R (Compact Disc Recordable) disc or a CD-RW (Compact Disc Rewritable) disc capable of recording data has been also further formed and put into practical use.

The DVD-video discs have been developed for the purpose of recording digital video data such as videos or images. A standard concerning a DVD-ROM disc for recording data that can be processed by a computer is also formed like the CD-ROM disc. The DVD video discs or the DVD-ROM discs are optical discs dedicated for reproducing. On the other hand, a standard concerning a DVD-R (DVD Recordable) disc or a DVD-RW(DVD Rewritable) disc capable of recording data is formed. As for the DVD discs capable of data, various kinds of formats have been proposed and commercially merchandised.

These discs of a CD system such as the CD-DA discs or the CD-ROM discs are different from the discs of a DVD system such as the DVD-video discs or the DVD-ROM discs in modulation system of data to be recorded or error correction encoding system or the like. However, any of these discs has the diameter of 12 cm or 8 cm and substantially has the thickness of 1.2 mm. A drive that can record or reproduce data in a single recording and/or reproducing part, that is, a recording and/or reproducing device has been commercially merchandised for the CD discs and the DVD discs having the common size as described above. The recording and/or reproducing device that makes it possible to commonly use the CD discs and the DVD discs can record or reproduce data respectively on a plurality of kinds of optical discs having different standards as mentioned above.

A dual layer optical disc having two recording layers laminated has been also proposed by paying attention to a point that the CD disc and the DVD disc have the diameter of 8 cm or 12 cm and the thickness of about 1.2 mm. However, an optical beam incident on the recording layer of the two recording layers of the dual layer optical disc remote from a plane of incidence of an optical beam for recording and reproducing penetrates the recording layer near the plane of incidence. Thus, the strength of the optical beam is lowered. The optical beam reflected on the remote recording layer penetrates again the near recording layer. Accordingly, the remote recording layer may not be possibly irradiated with the optical beam having an adequate strength necessary for recording or the optical beam having an adequate strength may not be possibly obtained upon reproducing. The transmittance of the recording layer near the plane of incidence of the optical beam is raised so that a recording or a reproducing on the recording layer remote from the plane of incidence of the optical beam are properly performed. In this case, reflected light from the recording layer near the plane of incidence cannot be inconveniently sufficiently obtained upon reproducing of the recording layer near the plane of incidence.

DISCLOSURE OF THE INVENTION

It is an object of the present invention to provide a new optical recording medium capable of eliminating the problems of a conventional optical recording medium having a plurality of recording layers as described above.

It is another object of the present invention to apply an optical recording medium capable of assuredly recording data on a plurality of recording layers laminated in the direction of incidence of an optical beam and reproducing the recorded data.

It is a still another object of the present invention to apply an optical recording medium capable of assuredly recording data on a plurality of recording layers having different standards which are provided in the direction of incidence of an optical beam and reproducing the recorded data.

An optical recording medium according to the present invention comprises a first light transmitting layer; a layer composed of an organic dye for recording and reading data by an optical beam of a first wavelength incident through the first light transmitting layer and transmitting an optical beam of a second wavelength incident through the first light transmitting layer; a second light transmitting layer for transmitting the optical beam of the second wavelength incident through the layer composed of the organic dye; and a reflecting layer for reflecting the optical beam of the second wavelength incident through the second light transmitting layer.

In the layer of composed of the organic dye, a refractive index under the first wavelength of the optical beam having the first wavelength before recording is set to be larger than the refractive index of the first light transmitting layer and a refractive index under the first wavelength after recording is set to be substantially the same as that of the first light transmitting layer.

An optical recording medium according to the present invention further comprises a protective layer provided in the plane side of incidence of the optical beam of the first wavelength of the layer composed of the organic dye to protect the layer composed of the organic dye and an adhesive layer provided between the protective layer and the first transmitting layer.

An optical recording medium according to the present invention further comprises a layer composed of an organic dye between the reflecting layer and the second light transmitting layer and the data is recorded and read by the optical beam of the second wavelength on the layer composed of the organic dye.

An optical recording medium according to the present invention comprises a first light transmitting layer; a recording layer on which data is recorded and read by an optical beam of a first wavelength incident through the first light transmitting layer, and which transmits an optical beam of a second wavelength incident through the first light transmitting layer and has a refractive index under the first wavelength of the optical beam before recording larger than the refractive index of the first light transmitting layer and a refractive index under the first wavelength after recording substantially the same as the refractive index of the first light transmitting layer; a second light transmitting layer for transmitting the optical beam of the second wavelength incident through the recording layer; and a reflecting layer for reflecting the optical beam of the second wavelength incident through the second light transmitting layer.

Still another objects of the present invention and specific advantages obtained by the present invention will be more apparent from embodiments and Examples described below by referring to the drawings.

BEST MODE FOR CARRYING OUT THE INVENTION

Figure 1:
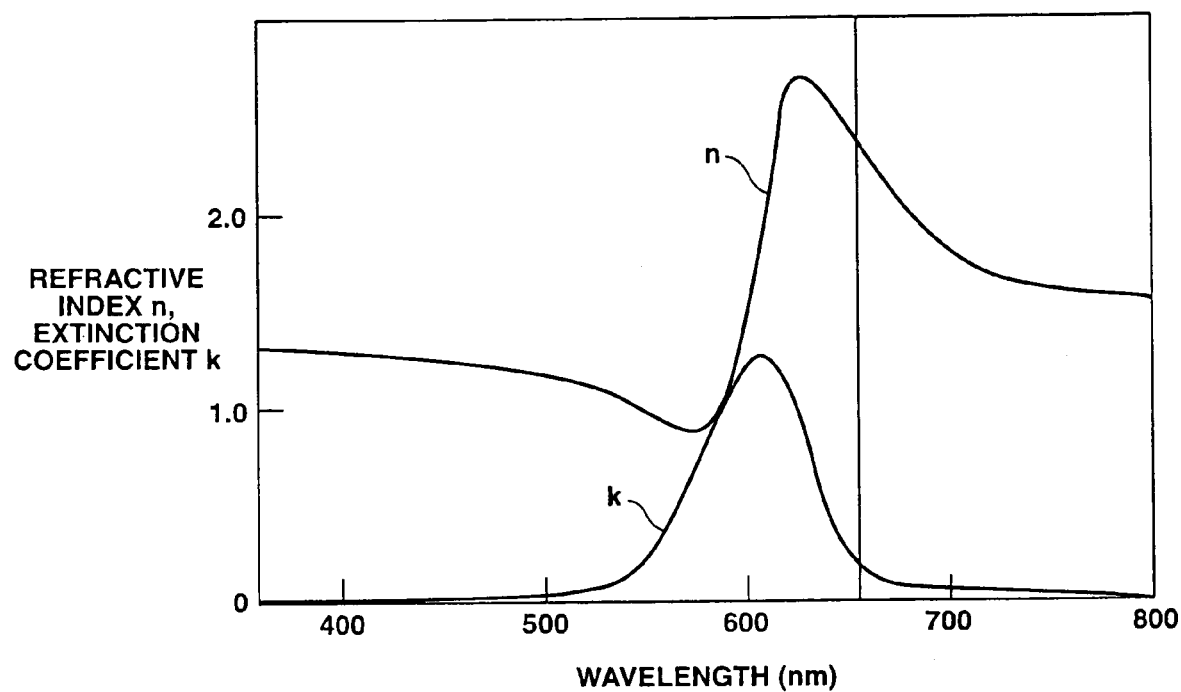
FIG. 1 is a characteristic view showing the wavelength dependence of optical constants (refractive index n and extinction coefficient (absorption coefficient) k) before the recording of a recording layer having an organic dye layer that forms a recording layer based on the standard of a DVD forming an optical recording medium according to the present invention.

Now, an optical recording medium according to the present invention will be specifically described below.

The optical recording medium according to the present invention is formed in such a manner that a plurality of recording layers are laminated in the direction of incidence of an optical beam. Particularly, the optical recording medium described below is formed by laminating a plurality of recording layers having different standards in the direction of incidence of the optical beam.

More specifically, the optical recording medium according to the present invention includes either a first recording layer having a first organic dye layer based on the standard of a DVD-R disc on which data is recorded or reproduced by using an optical beam whose wavelength is 650 nm or a second recording layer having a second organic dye layer on which data is recorded or reproduced by using an optical beam whose wavelength is, for instance, 400 nm to 410 nm and an objective lens having numerical aperture NA of 0.85. The optical recording medium further includes a recording layer based on any of standards of a CD disc, a CD-DA disc and a CD-ROM disc dedicated for reproducing on which data is reproduced by an optical beam whose wavelength is 780 nm or a CD-R disc and a CD-RW disc capable of recording data. The former recording layer and the latter recording layer are laminated.

Further, the present invention concerns an optical recording medium comprising a first recording layer having a first organic dye layer based on the standard of the DVD-R disc, a second recording layer having a second organic dye layer using an optical beam whose wavelength is 400 nm to 410 nm for recording and reproducing data, and a recording layer dedicated for reproducing based on the standard of the CD disc dedicated for reproducing.

Still further, an optical recording medium according to the present invention comprises a second recording layer having a second organic dye layer using an optical beam whose wavelength is 400 nm to 410 nm for recording and reproducing data and a recording layer based on any of the standards of a DVD and a DVD-ROM disc dedicated for reproducing on which data is reproduced by using an optical beam whose wavelength is 650 nm or a DVD-R disc and a DVD-RW disc capable of recording data. These recording layers are laminated.

Now, a signal detecting principle by a reflectivity modulation system used for reproducing information recorded on the recording layer using the organic dye layer provided in the optical recording medium according to the present invention is made clear. For this purpose, the signal detecting principle by the phase modulation system is firstly described. Here, as one example, the signal detecting principle by the phase modulation system will be described in a first recording layer having an organic dye layer provided in a write-once DVD-R disc in which data is recorded once and the recorded data is reproduced by using an optical beam whose wavelength is substantially 650 nm.

FIG. 1 shows an absorption spectrum indicating the wavelength dependence of refractive index n and extinction coefficient (absorption coefficient) k as optical constants before recording on the first recording layer composed of the first organic dye layer in which information is recorded based on the standard of the DVD-R disc. The absorption spectrum shown in FIG. 1 is the same as the absorption spectrum of a non-recorded part of the first recording layer based on the standard of the DVD-R disc used in the present invention.

Between the refractive index n and the extinction coefficient k, a relation represented by Kramers-Kroning relation exists. As shown in FIG. 1, when an optical beam having the wavelength in the vicinity of 600 nm is absorbed, the refractive index n greatly changes in the vicinity of the absorption. That is, in an area where the absorption of the optical beam does not exist, while the refractive index n is substantially 1.5, the refractive index n exceeds 2 under the wavelength of 650 nm.

Figure 2A:
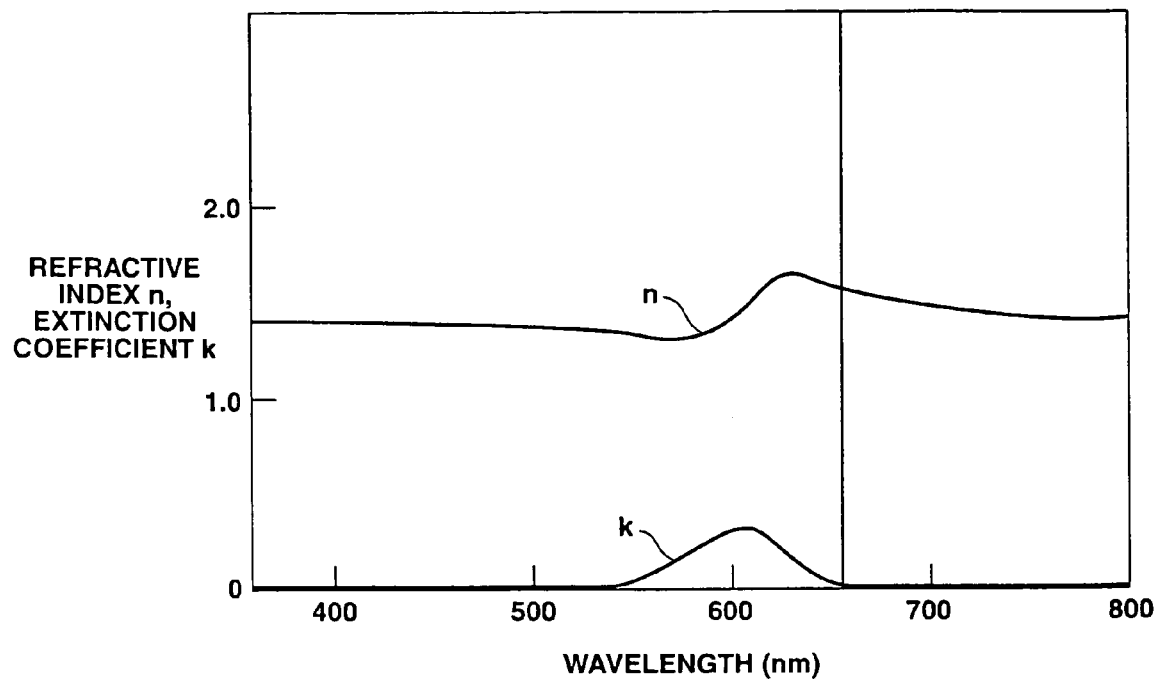
FIG. 2A is a schematic view showing the wavelength dependence of optical constants after the recording of an organic dye layer that forms a recording layer based on the standard of a DVD employed for an optical recording medium according to the present invention when the level of an absorption spectrum is lowered.
Figure 2B:
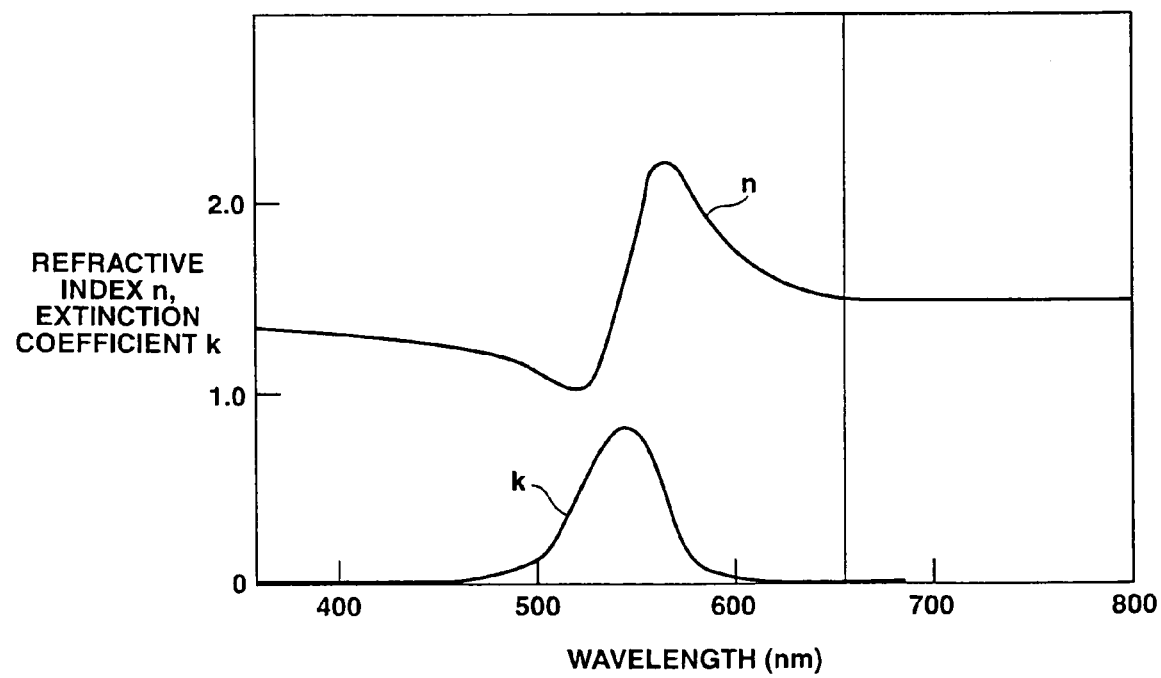
FIG. 2B is a schematic view showing the wavelength dependence of optical constants after the recording of an organic dye layer that forms a recording layer based on the standard of a DVD employed for an optical recording medium according to the present invention when the absorption spectrum shifts to a short wavelength side.

When the organic dye layer forming the recording layer is irradiated with the optical beam to record data, the organic dye layer generates a property change. When the organic dye molecules generate the property change, the absorption spectrum of the optical beam changes. The absorption spectrum showing the wavelength dependence of optical constants anticipated after data is recorded on the organic dye layer is schematically shown in FIGS. 2A and 2B. The absorption spectrum shown in FIGS. 2A and 2B is also the same as that of the first recording layer composed of the first organic dye layer in which information is recorded or reproduced based on the standard of the DVD-R disc used in the present invention.

FIG. 2A shows the absorption spectrum when the property change of the organic dye molecules is caused in the organic dye layer forming the recording layer after data is recorded so that the absorption of an optical beam degenerates to a low state. FIG. 2B shows an absorption spectrum when the absorption of an optical beam shifts to a shorter wavelength side as a spectrum of a product obtained after the property change of the organic dye molecules is generated in the organic dye layer forming the recording layer after recording. The organic dye layer after the data is recorded may be possibly expected to have a spectrum widened. The absorption spectrum of the organic dye layer after the data is actually recorded is estimated as a combination of those shown in FIGS. 2A and 2B or the like. The refractive index n comes near to 1.5 under the optical beam whose wavelength is about 650 nm due to the property change of the organic dye layer after such a recording. As described above, such a change of the refractive index n that the refractive index exceeding 2 before the data is recorded changes to come near to 1.5 after recording is recognized, not only in the organic dye layer forming the recording layer based on the standard of the write-once DVD-R disc, but also in the organic dye layer forming the recording layer based on the standard of the write-once CD-R disc. In such a way, while the thickness of the film of the organic dye layer forming the recording layer remains constant, the refractive index n changes before and after the data is recorded. Thus, the optical path length of the optical beam incident on the organic dye layer changes to generate a phase shift so that coherent scattering is caused. Consequently, a signal is detected as the change of the refractive index. This is the signal detecting principle of the recording layer having the organic dye layer by the phase modulation system.

The organic dye layer forming the recording layer based on the standard of the CD-R disc has the absorption peak of the optical beam located in the vicinity of 700 nm. For instance, the wavelength of the optical beam used for recording and reproducing is about 780 nm. In this case, the organic dye layer forming the recording layer based on the standard of the CD-R disc is different from the organic dye layer forming the recording layer based on the standard of the DVD-R disc from the viewpoint that the refractive index before recording the data is near to 3.

Figure 3:
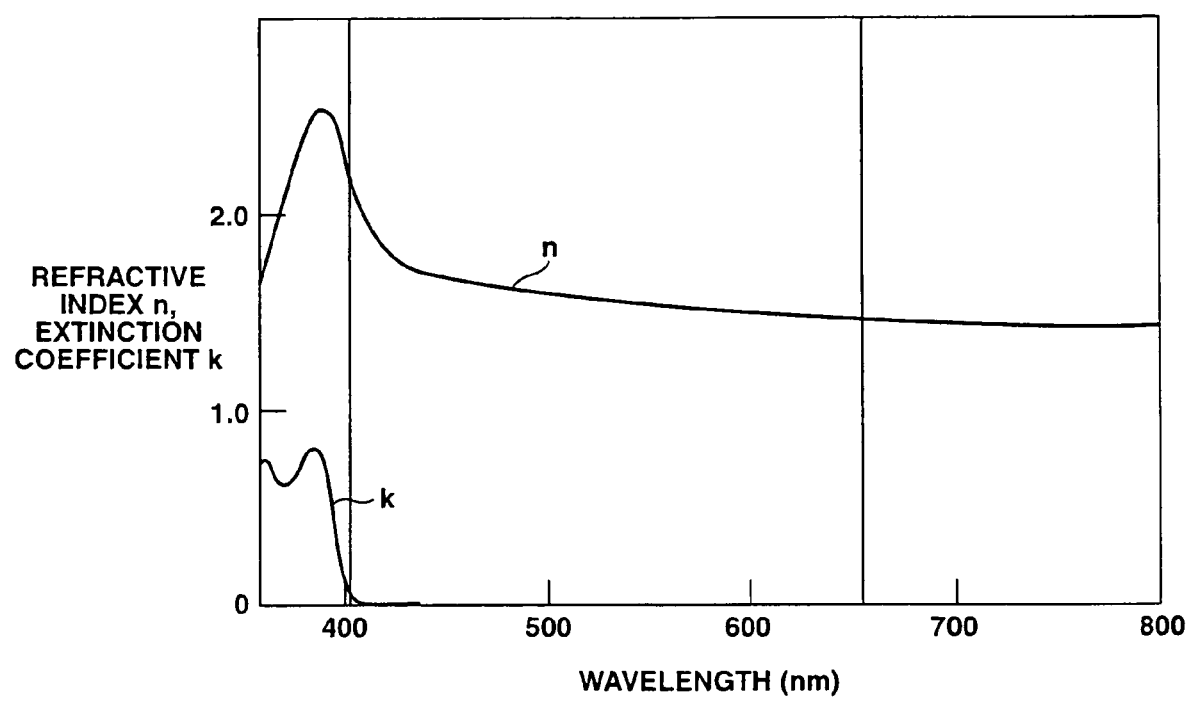
FIG. 3 is a schematic view showing the wavelength dependence of optical constants after the recording of an organic dye layer that forms a recording layer based on the standard of a DVD employed for an optical recording medium according to the present invention.

The signal detecting principle of the recording layer using the organic dye layer by the phase modulation system is likewise applied to an organic dye layer provided as a recording layer on an optical disc using an optical beam whose wavelength is shorter than that of an optical beam used for recording and reproducing in a conventional optical disc, for instance, an optical beam whose wavelength is located within a range of 380 nm to 450 nm. FIG. 3 shows an absorption spectrum indicating the wavelength dependence of refractive index n and extinction coefficient k as optical constants before recording on the organic dye layer forming the recording layer of the optical disc using the optical beam having such short wavelength. The absorption spectrum shown in FIG. 3 is the same as that of an organic dye layer forming a recording layer provided in an optical disc using an optical beam having short wavelength of 380 nm to 450 nm for recording and reproducing data used in the present invention.

The optical beam having the wavelength of 380 nm to 450 nm is an optical beam located in the wave band of violet blue color.

In the recording layer having the organic dye layer using the optical beam located in the wave band of violet blue for recording and reproducing, the molecules of the organic dye layer are designed so that the refractive index n of the optical beam is higher than 1.5 in the vicinity of the wavelength of 405 nm.

In the organic dye layer forming the recording layer used for an optical disc that uses the optical beam located in the wave band of violet blue for recording and reproducing, absorption spectrum level is lowered or moved to change. Further, the refractive index is changed, the optical path length of the optical beam incident on the optical disc is changed and a phase shift is generated. Thus, a signal can be detected, like the organic dye layer forming the recording layer based on the standard of the above-described DVD-R disc.

Depending on the design of the molecules of the organic dye layer forming the recording layer, may be considered a recording principle that the refractive index before recording data is about 1.0 and the refractive index after recording the data is about 1.5 when the absorption peak of an optical beam is located in the vicinity of 450 nm and the wavelength of the optical beam is located, for instance, in the vicinity of 405±5 nm. A demonstrative experimental result about this principle is reported in T. Iwamura, Y. Sabi, M. Oyamada, H. Watanabe, S. Tamada and S. Tamura; International Symposium on Optical Memory (ISOM), Taipei, Taiwan, Fr-L-04 (document 1).

In the recording layer provided on the optical disc using the optical beam located in the above-described wave band of violet blue by using the phase modulation system like a recording layer used for the DVD-ROM as the signal detecting principle, a metallic reflecting film is formed adjacently to the organic dye layer. The reflectivities of the optical beam before and after recording data are 60% or higher.

The standard of the DVD disc is more generous than that of the CD disc in respect of the reflectivity of the optical beam for recording and reproducing the data. For instance, when the reflectivity of the optical beam is about 10%, the data recorded on a signal recording layer can be read. That is, in the DVD, when the reflectivity of the optical beam incident on the signal recording layer can be maintained to about 10%, the metallic reflecting film for positively reflecting the optical beam need not be provided.

Actually, when the refractive index n of the organic dye layer forming the recording layer provided on the DVD-R before recording data is 2.5 relative to the optical beam whose wavelength is 650 nm, a reflection is generated on an interface between a board serving as the light transmitting layer of the optical beam incident on the recording layer and the recording layer, because the refractive index of the board is about 1.5. Thus, even when the metallic reflecting film is not present, the reflectivity of about 10% can be realized. More specifically, for instance, in case the extinction coefficient k is 0.1, when the thickness of the organic dye layer forming the recording layer is 65 nm, the reflectivity of the optical beam incident on the board and reflected from the organic dye layer is 20%.

Further, when the refractive index n of the organic dye layer forming the recording layer provided in the DVD-R after recording data is about 1.5 relative to the optical beam whose wavelength is 650 nm, the reflectivity of the optical beam incident on the board and reflected from the organic dye layer reaches a value substantially near to 0%, because the refractive index of the board serving as the light transmitting layer is about 1.5.

As the recording layer based on the standard of the DVD-R disc provided in the optical recording medium according to the present invention, an organic dye layer in which the reflectivity of an optical beam for recording and reproducing data is 10% before recording the data and the reflectivity of the optical beam is substantially 0% after recording the data is employed. Thus, an information signal recorded by what is called a reflectivity modulation system can be detected. In the reflectivity modulation system, the change of the reflectivity of the optical beam reflected from the organic dye layer is directly observed to detect an actual reflectivity difference between before and after recording the data. This reflectivity modulation system is also put into practice in the detection of an information signal recorded on a recording layer using a phase change film. However, since a phase change material forming the phase change film is high in its absorption coefficient of an optical beam, the transmittance of the optical beam is rather low.

It is to be noted that the first recording layer using the first organic dye layer based on the standard of the DVD-R disc forming the optical recording medium according to the present invention which employs such a reflectivity modulation system does not use the metallic reflecting film. Accordingly, the transmittance of the optical beam is high. For instance, the transmittance of even an optical beam having the wavelength of 650 nm used for recording and reproducing of the DVD-R disc exceeds 60%.

Further, the wavelength dependence of the refractive index n of the first recording layer using the first organic dye layer based on the standard of the DVD-R disc which forms the optical recording medium according to the present invention is to be paid attention to. That is, an organic dye material forming the first organic dye layer which constitutes the first recording layer based on the standard of the DVD-R disc designed to record and reproduce data by the optical beam whose wavelength is about 650 nm has a refractive index n of about 1.3 to 1.7 near to 1.5 as the refractive index of the board as the light transmitting layer before and after recording data relative to an optical beam having the wavelength of 780 nm used for recording and reproducing the data of the optical disc based on the standard of the CD disc or relative to an optical beam having the wavelength of 405 nm used for recording and reproducing a second recording layer having a second organic dye layer provided in the optical recording medium of the present invention. The extinction coefficient k of the organic dye material is substantially 0 or a low value.

The first recording layer using the first organic dye layer based on the standard of the DVD-R disc designed as described above has a transmittance exceeding 90% relative to the optical beam of 780 nm used for recording and reproducing the data of the optical disc based on the standard of the CD disc. Further, the first recording layer hardly generates a phase shift due to the change of the refractive index n between before and after recording the data. Accordingly, the first recording layer is hardly discriminated from a material forming the board. As a result, in the optical recording medium according to the present invention, an information signal recorded based on the standard of the CD disc is not detected in the first recording layer having the first organic dye layer corresponding to the recording layer based on the standard of the DVD-R disc. Further, the first recording layer having the first organic dye layer based on the standard of the DVD-R disc provided in the optical recording medium according to the present invention is substantially transparent to the optical beam having the wavelength of 780 nm used for recording and reproducing the data of the optical disc based on the CD disc.

Thus, the optical recording medium according to the present invention has a two-layer structure including the first recording layer having the first organic dye layer based on the standard of the DVD-R disc capable of detecting a reproducing signal by such a reflectivity modulation system, and a recording layer based on the same standard as that of the recording layer provided on the optical disc based on the standard of the CD discs including the CD-disc, the CD-R disc, the CD-ROM disc and the CD-RW disc.

As described above, the first recording layer having the organic dye layer based on the standard of the DVD-R disc and the recording layer based on the same standard as that of the recording layer provided on the optical disc based on the standard of the CD disc are arranged on a common board. In this case, an aberration or the like caused from the optical beam for recording and reproducing the data of the recording layer based on the standard of the CD disc penetrates the first recording layer hardly arises. The reflectivity of the optical beam for recording and reproducing the data in the recording layer based on the standard of the CD disc is maintained to 70% or higher. Therefore, the optical recording medium according to the present invention is mounted on a disc player that uses the optical discs based on the standard of the CD disc. In this case, an information signal is recorded on the recording layer based on the standard of the CD disc or the information signal recorded on this recording layer can be reproduced. Further, the optical recording medium according to the present invention is. mounted on a disc player that uses the optical discs based on the standard of the DVD-R disc. In this case, an information signal on the first recording layer based on the standard of the DVD-R disc can be recorded and reproduced.

On the recording layer using the organic dye layer provided in the optical recording medium according to the present invention which uses the optical beam located in the wave band of violet blue color for recording and reproducing data, an information signal recorded by the reflectivity modulation system can be also detected like on the recording layer using the organic dye layer based on the standard of the DVD-R disc. This demonstrative experimental result is also reported in the above-described document 1.

Thus, on the recording layer using the organic dye layer provided in the optical recording medium according to the present invention which employs the optical beam located in the wave band of violet blue for recording and reproducing data, a reproducing signal can also be detected in accordance with the reflectivity modulation system by using the same layer structure as that of the recording layer using the organic dye layer based on the DVD-R disc. For instance, a metallic reflecting film does not need to be provided by using the reflectivity modulation system likewise on the recording layer using the organic dye layer optimized to an optical beam having the wavelength of 405 nm. The transmittance of the optical beam in the recording layer is high like the above-described recording layer having the organic dye layer based on the standard of the DVD-R disc.

The recording layer having the organic dye layer forming the optical recording medium according to the present invention that uses the optical beam located in the wave band of violet blue for recording and reproducing data has a refractive index n of about 1.3 to 1.7, which is substantially equal to the refractive index n of 1.5 of the board as the light transmitting layer, relative to the optical beam having the wavelength of 650 nm or 780 nm used for recording and reproducing the data of the DVD disc or the CD disc. The extinction coefficient k of the recording layer is substantially 0 or a low value. The organic dye layer forming the recording layer designed as described above to use the optical beam located in the wave band of violet blue for recording and reproducing data has a transmittances exceeding 90% and 50% respectively relative to the optical beams having the wavelengths used for recording and reproducing the data of the CD disc or the DVD disc. Further, the organic dye layer hardly generates a phase shift due to the change of the refractive index n. Accordingly, the organic dye layer is hardly discriminated from a material forming the board. Thus, in a second organic dye layer, an information signal recorded based on the standard of the CD disc or an information signal recorded based on the standard of the DVD is not detected. Further, the organic dye layer forming the recording layer provided in the optical recording medium according to the present invention that uses the optical beam located in the wave band of violet blue is substantially transparent to the optical beam having the wavelength used for recording and reproducing the data of the CD disc or the DVD disc. That is, the organic dye layer forming the recording layer provided in the optical recording medium according to the present invention that uses the optical beam located in the wave band of violet blue for recording and reproducing substantially allows the optical beam used for recording and reproducing the data of the CD disc or the DVD disc to penetrate the organic dye layer.

Accordingly, as the optical recording medium of the present invention, such structures as described below may be employed. That is, a structure is employed which includes a second recording layer having a second organic dye layer that uses the optical beam located in the wave band of violet blue for recording and reproducing data and a recording layer for recording and reproducing data based on the standard of the CD disc. Further, a structure is employed which includes the second recording layer having the above-described second organic dye layer and the first recording layer using the first organic dye layer for recording and reproducing data based on the standard of the DVD disc. Still further, a structure is employed which includes the second recording layer having the above-described second organic dye layer, the first recording layer having the first organic dye layer corresponding to the recording layer based on the standard of the DVD-R disc, and the recording layer based on the standard of the CD disc dedicated for reproducing of data.

Now, specific structural examples of the optical recording medium according to the present invention will be described by referring to the drawings.

A first embodiment of the optical recording medium according to the present invention will be described by referring to FIG. 4.

An optical recording medium 10 according to the first embodiment of the present invention comprises a first recording layer 11 based on the standard of the DVD capable of detecting a signal by the above-described reflectivity modulation system, especially, based on the standard of the DVD-R disc, a first board 12 as a light transmitting layer on which the first recording layer 11 is formed, a first recording layer 13 dedicated for reproducing data as a recording layer based on the standard of the CD disc on which information is previously recorded, a second board 14 as a light transmitting layer on which the first recording layer 13 dedicated for recording data is formed, and a protective layer 15 formed on the first recording layer 13 dedicated for reproducing data to protect the first recording layer 13 dedicated for reproducing and made of, for instance, an ultraviolet curing resin. The first recording layer 11 based on the standard of the DVD-R disc is a recording layer capable of recording an information signal once. To record information on the first recording layer 11 or to reproduce the information signal recorded on the first recording layer 11, an optical beam having the wavelength of 635 nm to 660 nm, preferably the wavelength of 650 nm is used. To reproduce information recorded on the first recording layer 13 dedicated for reproducing, an optical beam having the wavelength of 770 nm to 830 nm, preferably the wavelength of 780 nm is used.

The first board 12 and the second board 14 are made of, for instance, polycarbonate (PC), amorphous polyolefin (APO), polymethyl methacrylate (PMMA), polyethylene terephthalate (PET), an acrylic resin, a polyimide resin, a glass material, etc. These boards may be preferably made of polycarbonate (PC). As the material of the first board 12 and the second board 14, a material low in absorbency index of light is preferably used.

The thickness of the first board 12 on which the first recording layer 11 based on the standard of the DVD-R disc is formed is about 0.550 mm to 0.653 mm, and more preferably 0.6 mm. The thickness of the second board 14 on which the first recording layer 13 dedicated for reproducing is formed is about 0.447 mm to 0.850 mm, and more preferably 0.6 mm. The first recording layer 11 is formed at a position spaced by 0.550 nm to 0.653 nm from the plane of incidence on which an optical beam for recording and reproducing data on the optical recording medium 10 according to the present invention is incident. The first recording layer 13 dedicated for reproducing is formed at a position spaced by 1.10 mm to 1.40 mm from the plane of incidence of the optical beam.

The refractive index n of the first board 12 and the second board 14 forming the optical recording medium 10 according to the present invention is about 1.5. The refractive index n when, for instance, polycarbonate (PC) is employed as a material of the first board 12 and the second board 14 is 1.5 to 1.55 relative to an optical beam having the wavelength of about 780 nm and an optical beam having the wavelength of about 650 nm. The refractive index n is 1.60 relative to an optical beam having the wavelength of about 400 nm. The refractive index of the first board 12 and the second board 14 when glass is used as a material forming the first board 12 and the second board 14 is substantially 1.46 relative to any of the optical beams of the above-described wavelengths. As described above, the refractive index of the first board 12 and the second board 14 is around 1.5 relative to any of the optical beams of the above-described wavelengths.

On a surface provided in the first board 12 in which the first recording layer 11 based on the standard of the DVD-R disc is formed, guide grooves having a track pitch of 0.74±0.03 µm are formed. The form of the guide groove is adapted to the reflectivity modulation system. The depth of the groove is set to, for instance, about 60 nm, the width of the groove as an area where an information signal is recorded, that is, the width of a track is set to, for instance, about 0.35 µm.

On the second board 14, a micro irregular pattern showing an information signal forming the first recording layer 13 dedicated for reproducing based on the standard of the CD disc is formed.

A surface of the first board 12 opposite to the surface on which the first recording layer 11 is provided and the guide grooves are formed is a plane of incidence on which the optical beam for recording and reproducing data is incident. This surface serves as a surface for reading the information signal recorded on the first recording layer 11 and the first recording layer 13 dedicated for reproducing.

The first recording layer 11 includes the guide grooves, which are not shown, formed on the first board 12, a first organic dye layer 111 formed on the guide grooves, and a protective film 112 as a dielectric layer composed of, for instance, an SiN film 112a and an $SiO_2$ film 112b provided to cover the organic dye layer 111. In the first recording layer 11 forming the optical recording medium of this embodiment, a reflecting film is not provided.

The first organic dye layer 111 forming the first recording layer 11 is a layer made of an organic material which absorbs light upon irradiation of an optical beam to generate a property change and change optical constants such as refractive index. As materials of the organic dye layer 111, organic dye materials such as cyanine dye, phthalocyanine dye, azo dye are used. Preferably, a cyanine organic dye, for instance, "NK-4295" (trade name: product of Nippon Kanko Shikiso Kenkyusho Co., Ltd.) is employed.

The thickness of the first organic dye layer 111 is preferably, for instance, 45 nm to 80 nm, and more preferably about 65 nm. The thickness of the organic dye layer 111 may be such a thickness that the reflectivity of an optical beam for recording and reproducing data in a non-recorded part is 10% or higher.

The absorption spectrum in the non-recorded part and the recorded part of the first organic dye layer 111 is the same as those shown in FIGS. 1 and 2.

The refractive index n of an optical beam whose wavelength is 635 nm to 660 nm for recording and reproducing an information signal on the first organic dye layer forming the first recording layer which is formed based on the standard of the DVD-R disc is about 2.5 on the non-recorded part as shown in FIG. 1. The refractive index n on the recorded part is about 1.5 as shown in FIG. 2A.

Here, when the optical beam has the wavelength of about 635 nm to 660 nm and the thickness of the first organic dye layer is 45 nm to 80 nm the reflectivity of the non-recorded part of the first organic dye layer 111 forming the first recording layer 11 is 15% or higher. When the thickness of the organic dye layer is 65 nm, the reflectivity is about 20%. The reflectivity of the optical beam on the non-recorded part of the first organic dye layer 111 may be 10% or higher under which the information signal can be recorded and reproduced based on the standard of the DVD.

The refractive index of the optical beam on the recorded part of the first organic dye layer 111 is about 1.5. As described above, the refractive index on the first board 12 and the second board 14 is likewise substantially equal to about 1.5. Accordingly, the reflectivity on the recorded part of the first organic dye layer 111 is substantially 0% or a value near to 0%.

When $SiO_2$ film 112b is directly formed on the organic dye layer 111, the organic dye layer 111 is changed in quality and the refractive index is lowered. Accordingly, the SiN film 112a forming the protective film 112 is formed to be thin so as to protect the organic dye layer 111.

The $SiO_2$ film 112b forming the protective film 112 serves to prevent the organic dye layer 111 from being dissolved to an adhesive for bonding the first board 12 to the second board 14.

Even when the first recording layer 11 having the first organic dye layer 111 is provided with the SiN film 112a and the $SiO_2$ film 112b, an optically adverse effect is not generated. This is because of a fact that the thickness of the SiN film 112a is small and the refractive index of the $SiO_2$ film 112b is about 1.5 and substantially the same as those of the first bard 12 and the second board 14.

The thickness of the SiN film 112a is preferably 3 nm or higher and 10 nm or lower, and more preferably 5 nm. When the thickness of the SiN film 112a is smaller than 3 nm, the deterioration of an organic dye forming the first organic dye layer 111 is recognized when the $SiO_2$ film 112b is formed. When the thickness of the SiN film 112a is 10 nm, the reflectivity is lowered by about 2%. When the thickness of the SiN film 112a is more increased, the recording and reproducing characteristics of the first recording layer 11 are deteriorated due to the decrease of the reflectivity.

The thickness of the $SiO_2$ film 112b is preferably 5 nm or higher, and more preferably 30 nm. Since the optical constants of the $SiO_2$ film 112b are substantially the same as those of the first board 12 and the second board 14, the $SiO_2$ film 112b does not have an optical dependence on the film thickness. Therefore, even when the thickness of the $SiO_2$ film 112b is larger than 30 nm, the same effect can be obtained. The thickness of the $SiO_2$ film 112b is preferably 5 nm or larger from the viewpoint of durability.

As the adhesive, any other material from which the effect of preventing the organic dye layer 111 from dissolving can be obtained may be used as well as the SiN film 112a and the $SiO_2$ film 112b.

As the material of the first organic dye layer 111 forming the first recording layer 11, a material that hardly dissolves to the adhesive and can form a film by a vapor deposition is selected. In this case, since an organic dye material does not diffuse to the second board 14, the protective film 112 is not necessarily required. The first organic dye layer 111 may be provided as a single layer.

The first recording layer 13 dedicated for reproducing based on the standard of the CD disc has a pit pattern as a micro irregular pattern showing information signals recorded on the second board 14 based on the standard of the CD disc and a reflecting film 131 made of, for example, aluminum formed so as to cover at least an area where the pit pattern is formed.

The refractive index of an optical beam having the wavelength of 770 nm to 830 nm used for reading the information signals recorded on the first recording layer 13 dedicated for reproducing on the first organic dye layer 111 forming the first recording layer 11 is approximately 1.3 to 1.7 near to the refractive index of the first board 12 and the second board 14 before and after recording data on the first organic dye layer 111. The extinction coefficient of the optical beam is substantially 0 or a low value. Therefore, the optical beam used for reproducing the data of the first recording layer 13 dedicated for reproducing which is formed based on the standard of the CD disc and located within a range of 770 nm to 830 nm passes through the first organic dye layer 111 forming the first recording layer 11. At this time, the optical beam hardly changes the refractive index to cause the phase shift. Further, the first organic dye layer 111 is substantially transparent relative to the optical beam having the wavelength of 770 nm to 830 nm. That is, the optical beam having the wavelength of 770 nm to 830 nm substantially penetrates the first organic dye layer 111.

Now, a method for producing the optical recording medium according to the present invention will be described below. To produce the optical recording medium 10 shown in FIG. 4, the first board 12 on which the guide grooves forming a part of the first recording layer 11 are provided is formed. The guide grooves provided in the first board 12 are formed in accordance with, for instance, an injection molding method, a photopolymer method (2P method), etc. by using a stamper on which an irregular pattern with the pattern form of the guide grooves inverted.

On the surface of the first board 12 having the guide grooves formed, the organic dye layer 111 is formed by a spin coat method or a deposition method. On the organic dye layer 111, the SiN film 112a and the $SiO_2$ film 112b forming the protective film 112 is sequentially formed by, for instance, a reactive sputtering method.

Not only the first board 12 is formed, but also the second board 14 is formed. On one surface of the second board 14, the pit pattern is formed as the micro irregular pattern showing the information signals recorded based on the standard of the CD disc. The pit pattern is formed in accordance with, for instance, the injection molding method, the photopolymer method (2P method) or the like by using a stamper having an irregular pattern with the pit pattern inverted.

On the surface of the second board 14 on which the pit pattern is formed, the reflecting film 131 forming the first recording layer 13 dedicated for reproducing is formed with the thickness of about 50 nm by, for instance, a sputtering method. On the reflecting film 131, an ultraviolet curing resin is applied with the thickness of, for instance, about 10 μm by a spin coat method, then this ultraviolet curing resin layer is irradiated with ultraviolet ray to form a cured protective layer 15.

Then, the first board 12 is bonded to the second board 14 in such a manner that the surface of the first board 12 on which the first recording layer 11 is formed is bonded to a surface opposite to the surface of the second board 14 on which the first recording layer 13 dedicated for reproducing is formed by an adhesive. As the adhesive, for instance, a pressure sensitive adhesive or a dry photopolymer sheet is employed. The pressure sensitive adhesive is a double sided adhesive sheet composed of, for instance, an acrylic adhesive and excellent in its transparence and uniformity. of thickness. A product of trade name: DA-8310 produced by Nitto Denko Corporation or the like is preferably used. The dry photopolymer sheet is an ultraviolet curing adhesive sheet having a viscosity of about 200 to 300 mega-poise and containing no solvent. For instance, trade name: SURPHEX produced by DuPont corporation may be used. This dry photopolymer sheet can be used when the first organic dye layer 111 forming the first recording layer 11 does not have absorption characteristics to the light located in the area of wavelength of ultraviolet ray. Accordingly, when the material forming the first organic dye layer 111 is "NK-4295", "NK-4295" does not have the absorption characteristics to the light of the wavelength area of ultraviolet ray. Thus, the dry photopolymer sheet can be used. The dry photopolymer sheet can be irradiated with the ultraviolet ray to be adequately cured.

The first board 12 provided with the first recording layer 11 having the first organic dye layer 111 based on the standard of the DVD-R disc, the first recording layer 13 dedicated for reproducing on which the information signals are previously recorded based on the standard of the CD disc, and the second board 14 are bonded together through the above-described steps. Thus, the optical recording medium 10 according to the present invention having a structure that the first recording layer 11 for recording and reproducing data and the first recording layer 13 dedicated for reproducing are laminated is completed.

In the optical recording medium 10 according to the present invention formed as mentioned above, the first recording layer 11 located in a reading side as the plane of incidence of an optical beam is irradiated with an optical beam having the wavelength located within a range of 635 nm to 660 nm. Since the reflectivity of the optical beam in the non-recorded part of the organic dye layer 111 forming the first recording layer 11 is 10% or higher and the reflectivity of the optical beam in the recorded part of the first organic dye layer 111 is substantially 0% or a reflectivity near to 0%. Accordingly, the information signal recorded on the first recording layer 11 can be detected by the reflectivity modulation system that the difference between the actual reflectivities is directly observed. The information signal is recorded on the first recording layer 11 in such a way that the output of an optical beam located within a range of 635 nm to 660 nm is increased more than its reproducing and the organic dye layer 111 is irradiated with the optical beam to absorb the optical beam. Thus, the materiality of a part of the organic dye layer 111 that absorbs the optical beam is changed to change the refractive index.

Figure 4:
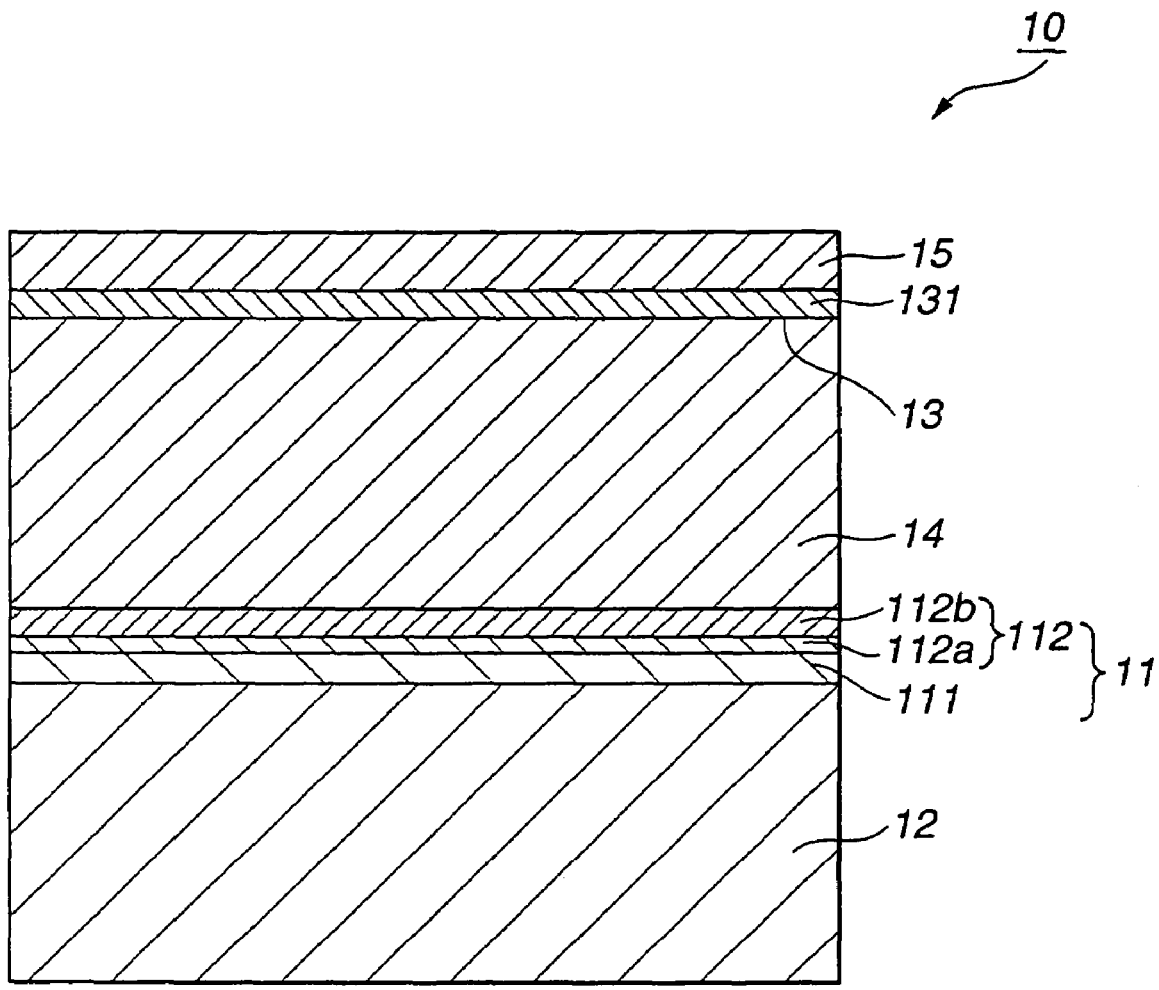
FIG. 4 is a sectional view showing the structure of layers of an optical recording medium according to the present invention.

In the optical recording medium 10 according to the present invention shown in FIG. 4, the data of the first recording layer 11 having no reflecting film which is formed based on the standard of the DVD-R disc can be reproduced. Further, the data of the first recording layer 13 dedicated for reproducing formed based on the standard of the CD disc which is formed in the same optical recording medium 10 can be also reproduced. That is, the transmittance of the optical beam used for reproducing the data of the first recording layer 13 dedicated for reproducing is at least 90% or higher in the first recording layer 11 having no reflecting film. Even when the optical beam having the wavelength located within a range of 770 nm to 830 nm used for reproducing the data of the first recording layer 13 dedicated for reproducing passes through the first recording layer 11 having the first organic dye layer 111, a phase shift hardly arises and substantially penetrates the first organic dye layer 111. Therefore, the reflectivity of the optical beam in the first recording layer 13 dedicated for reproducing can be maintained to 70% or higher. An aberration due to the penetration of the optical beam into the first recording layer 11 rarely arises. Therefore, good reproducing characteristics can be obtained for the first recording layer 13 dedicated for reproducing.

When the above-described optical recording medium 10 according to the present invention is mounted on a disc player using an optical disc based on the standard of the CD disc as a recording medium, an information signal such as audio information recorded on the first recording layer 13 dedicated for reproducing can be reproduced.

Further, when the optical recording medium 10 is mounted on a disc player using an optical disc based on the standard of the DVD-R disc as a recording medium, an information signal such as video information can be recorded on the first recording layer 11 having the first organic dye layer 111 and the information signal recorded on the first recording layer 11 can be reproduced.

Now, another embodiment of the optical recording medium according to the present invention will be described by referring to FIG. 5.

Figure 5:
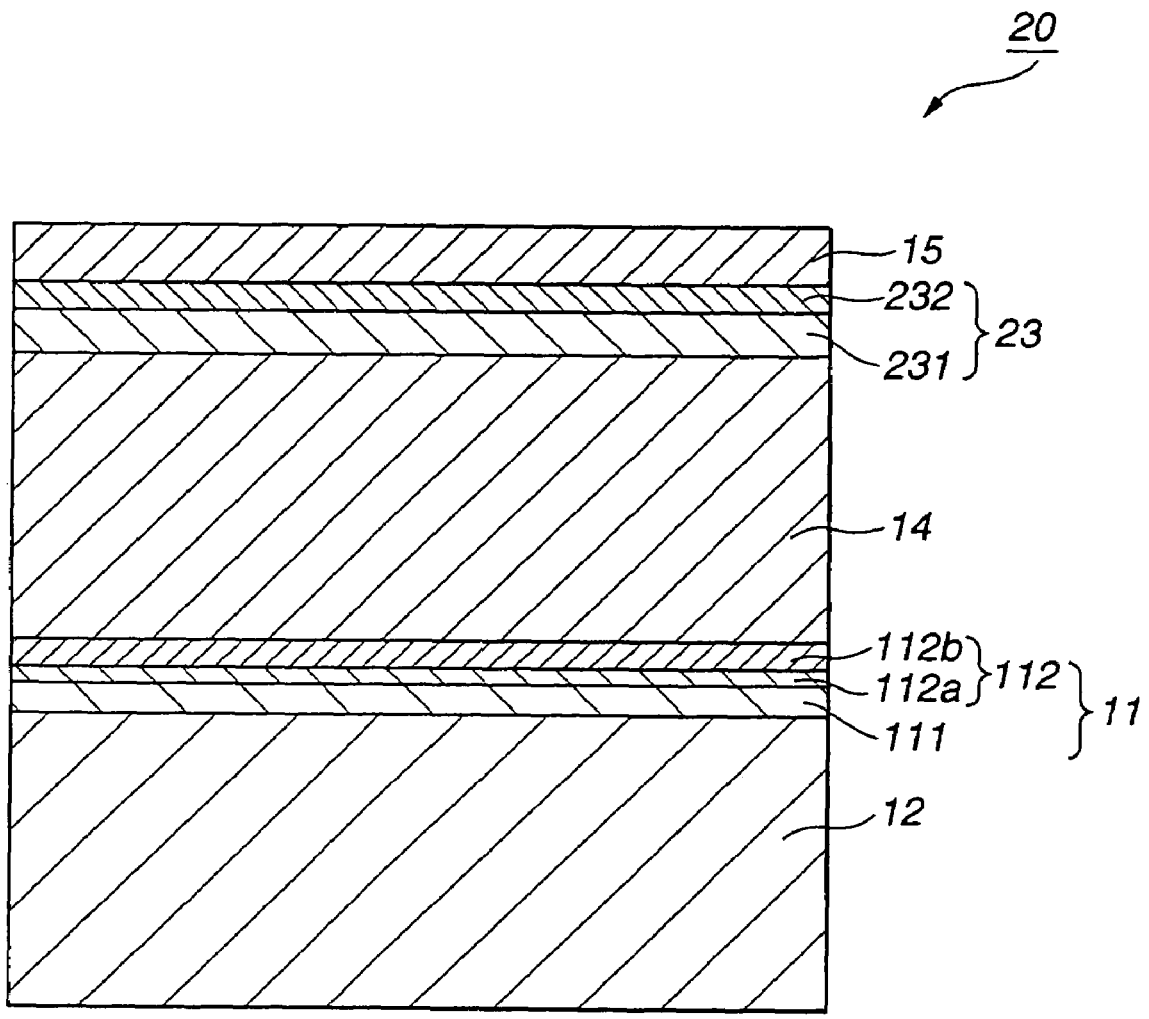
FIG. 5 is a sectional view showing the structure of layers of another optical recording medium according to the present invention.

An optical recording medium 20 shown in FIG. 5 has a third recording layer 23 formed based on the standard of the CD-R disc in place of the first recording layer 13 dedicated for reproducing provided in the optical recording medium 10 shown in FIG. 4. The third recording layer 23 includes guide grooves, which are not shown in the drawing, formed on a second board 14, a third organic dye layer 231 formed on the guide grooves, and a reflecting film 232 made of, for instance, Au (gold) which is formed on the organic dye layer 231.

The third organic dye layer 231 is made of an organic dye material such as cyanine, phthalocyanine, azo, etc. Preferably, cyanine organic dye, for example, "OM-57" (trade name: produced by Fuji Photo Film Co., Ltd.) is used. The third organic dye layer 231 is formed so as to have the thickness of, for instance, about 200 nm.

Now, a method for producing the optical recording medium 20 having the third recording layer 23 formed based on the standard of the CD-R disc will be described below.

In the production of the optical recording medium 20, a first recording layer 11 having a first organic dye layer 111 formed based on the standard of the DVD-R disc is formed on a first board 12 like the above-described optical recording medium 10.

Further, in the production of the optical recording medium 20, not only the first board 12 is formed, but also the second board 14 is formed like the above-described optical recording medium 10. On the second board 14, the guide grooves forming a part of the third recording layer 23 are formed. The guide grooves are formed in accordance with, for instance, the injection molding method or the photopolymer method (2P method) by using a stamper having an irregular pattern with the pattern form of the guide grooves inverted.

On a surface of the second board 14 on which the guide grooves are formed, the third organic dye layer 231 forming the third recording layer 23 is formed by, for instance, the spin coat method or the deposition method. On the third organic dye layer 231, the reflecting film 232 is formed by, for example, a sputtering method so as to have the thickness of, for instance, about 50 nm. On the reflecting film 232, a protective layer 15 is formed like the optical recording medium 10 shown in FIG. 4.

Here, the first board 12 is bonded to the second board 14. Accordingly, the optical recording medium 20 having a below-described structure can be obtained. In the structure of the optical recording medium 20, the first recording layer 11 having the first organic dye layer 111 in which an information signal based on the standard of the DVD-R disc can be recorded, and the third recording layer 23 in which an information signal based on the standard of the CD-R disc can be recorded are laminated. The optical recording medium 20 includes the two recording layers whose specifications are different from each other. The optical recording medium 20 is mounted on a disc player that uses an optical disc based on the standard of the CD-R disc as a recording medium. Then, the information signal is recorded in such a way that the output of an optical beam located within an area of 635 nm to 660 nm is increased more than that upon reproducing and the third recording layer 23 is irradiated with the optical beam to absorb the optical beam by the third organic dye layer 231 forming the third recording layer 23. Thus, the materiality of the organic dye layer 231 that absorbs the optical beam is changed to change the refractive index. The information signal of the third recording layer 23 is reproduced by the above-described phase modulation system.

When the optical recording medium 20 shown in FIG. 5 is mounted on a disc player using an optical disc based on the standard of the CD-R disc as a recording medium, an information signal such as audio information can be recorded or reproduced on the third recording layer 23. Further, when the optical recording medium 20 is mounted on a disc player using an optical disc based on the standard of the DVD-R disc as a recording medium, an information signal such as video information can be recorded on the first recording layer 11 having the first organic dye layer 111 and the information signal recorded on the first recording layer 11 can be reproduced.

Figure 6:
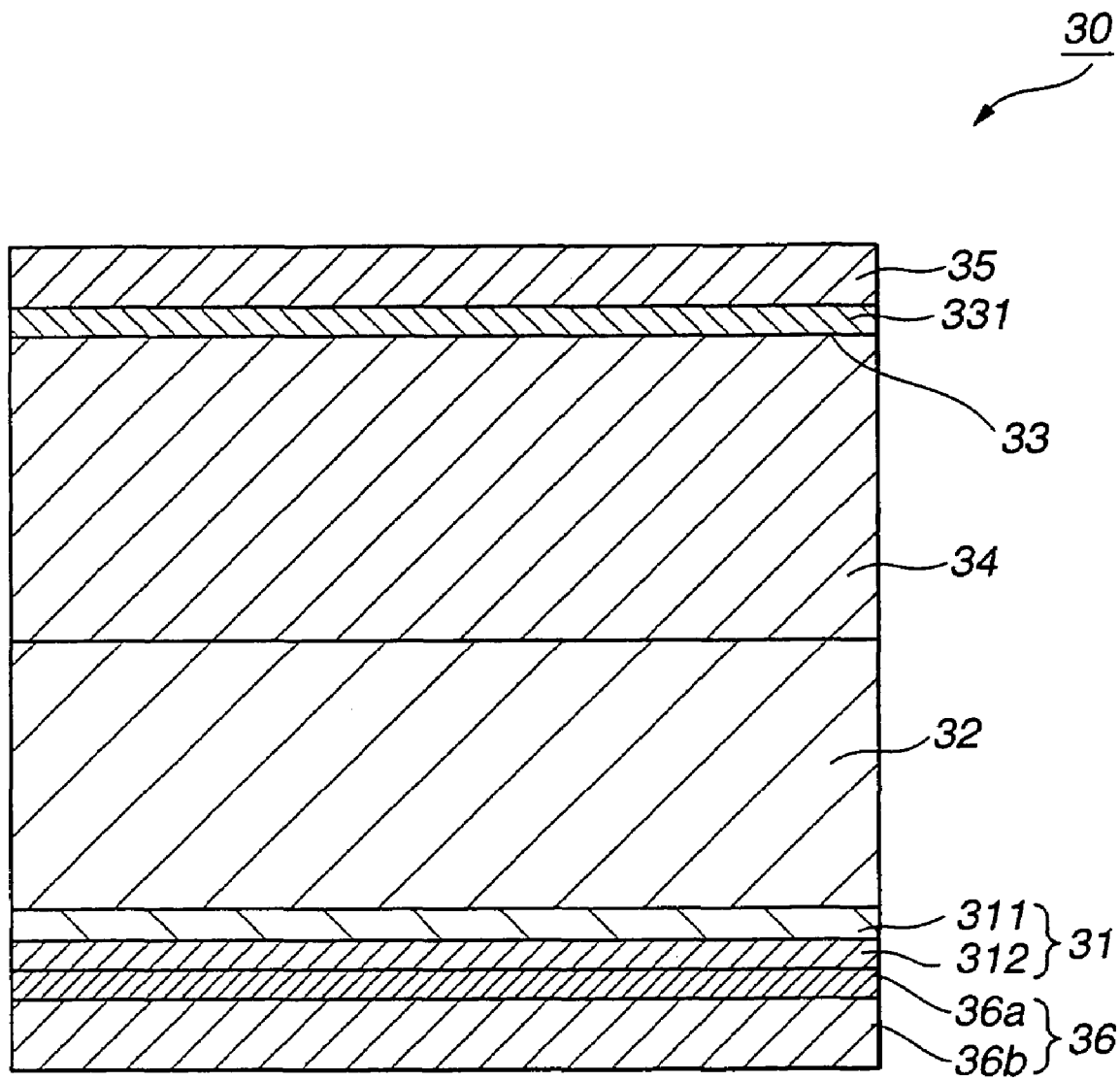
FIG. 6 is a sectional view showing the structure of layers of a still another optical recording medium according to the present invention.

A still another embodiment of the optical recording medium according to the present invention is shown in FIG. 6.

An optical recording medium 30 shown in FIG. 6 comprises a second recording layer 31 having a second organic dye layer 311 in which a recorded information signal can be detected in accordance with the above-described reflectivity modulation system by using an optical beam of violet blue located in the wave band of 380 nm to 450 nm for recording and reproducing, a first board 32 as a light transmitting layer on which the second recording layer 31 is formed, a protective film 36 formed on the second recording layer 31, a second recording layer 33 dedicated for reproducing based on the standard of the CD-ROM disc on which data based on the standard of the CD disc especially capable of being processed by a computer is recorded, a second board 34 as a light transmitting layer on which the second recording layer 33 dedicated for reproducing is formed, and a protective layer 35 made of, for instance, an ultraviolet curing resin which is formed on the second recording layer 33 dedicated for reproducing to protect the second recording layer 33 dedicated for reproducing. In the second recording layer 31, an information signal is recorded or reproduced. In the second recording layer 33 dedicated for reproducing, data information which can be processed by the computer is reproduced.

The second recording layer 31 records and reproduces the information signal by using an optical pick-up having an optical beam of violet blue located in the wave band of 380 nm to 450 nm, preferably the optical beam having the wavelength of 405±5 nm, and an objective lens with a numerical aperture (NA) of 0.85±0.05.

As materials of the first board 32 and the second board 34, materials the same as those used in the above-described optical recording medium 10 are employed. Preferably, polycarbonate (PC) is used.

The total thickness of the first board 32 and the second board 34 including the protective film 36 which form the optical recording medium 30 is preferably about 1.1 mm to 1.4 mm. For example, the thickness of the first board 32 is set to 0.5 mm and the thickness of the second board 34 is set to 0.6 mm. The refractive index in the first board 32 and the second board 34 relative to the optical beam is about 1.5 like the first embodiment. The second recording layer 31 is formed at a position spaced by 80 μm to 120 μm from the plane of incidence on which an optical beam for recording and reproducing data is incident in the optical recording medium 30. The second recording layer 33 dedicated for reproducing is formed at a position spaced by 1.10 mm to 1.40 mm from the plane of incidence on which the optical beam for recording and reproducing data in the optical recording medium 30.

In a surface side of the first board 32 on which the second recording layer 31 is formed, guide grooves having a track pitch of 0.32±0.015 µm and forming a part of the second recording layer 31 are formed. When a land-groove recording in which an information signal can be recorded both in adjacent lands and grooves is performed in the second recording layer 31, the groove is formed so as to have a pitch of, for instance, about 0.64 µm, the width of the land and the groove is set to be substantially the same and the track pitch is substantially set to 0.32±0.015 µm. When a groove recording is carried out, that is, a recording is performed only on a track surface located near an optical reading system of the guide grooves in the second recording layer 31, the depth of the groove is set to, for instance, about 20 nm and the width of the land is set to, for instance, about 0.15 µm.

In a surface side of the second board 34 on which the second recording layer 33 dedicated for reproducing is formed, a pit pattern as a micro irregular pattern which shows data capable of being processed by the computer based on the standard of the CD-ROM disc is previously formed.

In a surface side of the first board 32 on which the guide grooves forming a part of the second recording layer 31 are formed serves as a surface on which an optical beam for recording and reproducing data is incident and serves as a surface for reading the data of the second recording layer 31 and the second recording layer 33 dedicated for reproducing.

The second recording layer 31 includes the guide grooves, which are not shown in the drawing, formed on the first board 32, the second organic dye layer 311 formed on the guide grooves, and a protective film 312 made of, for instance, $SiO_2$ film, SiN film or the like provided so as to cover the organic dye layer 311. On the second recording layer 31 provided in the optical recording medium 30 of this embodiment, a reflecting film is not provided.

The second organic dye layer 311 is a layer made of an organic material that absorbs light due to irradiation of light to generate a property change and change optical constants such as a refractive index. As materials forming the second organic dye layer 311, for instance, a triphenyl amine derivative is preferable. For example, N,N'-bis(4-diphenyl amino-4-biphenyl)-N,N'-diphenyl benzidine [triphenyl amine tetramer] designed for blue light is employed. Further, as materials forming the second organic dye layer 311, organic dyes such as cyanine, phthalocyanine, azo, etc. are used. Preferably, the cyanine organic dye, for instance, 1-butyl-2-[5-(-1-butyl-3.3-dimethyl benz[e]indoline-2-ylidene)-1.3-pentadienyl]-3,3-dimethyl-1H-benz[e]indolium perchlorate is employed. Further, as the material forming the second organic dye layer 311, the material described in the above-mentioned document 1 can be used, which has, in its design of molecules, a refractive index of about 1.0 before recording data relative to an optical beam located in the wave band of 405±5 nm for recording and reproducing data and a refractive index of about 1.5 after recording data.

The thickness of the second organic dye layer 311 is preferably about 35 nm to 50 nm, and more preferably about 40 nm when, for instance, the triphenyl amine tetramer is used as a material. The organic dye described in the above-mentioned document 1, whose molecules are designed so that the organic dye layer has the refractive index of about 1.0 before recording data relative to the optical beam located in the wave band of 405±5 nm for recording and reproducing data and the refractive index of about 1.5 after recording data is used as a material. In this case, the thickness of the second organic dye layer 311 is preferably about 75 nm to 105 nm, and more preferably about 90 nm.

The thickness of the second organic dye layer 311 may be a thickness in which the reflectivity of a non-recorded part is 10% or higher. The absorption spectrum in the non-recorded part of the second organic dye layer 311 is the same as that shown in FIG. 3.

As shown in FIG. 3, when, for instance, the triphenyl amine tetramer is used as the material forming the second organic dye layer 311, the refractive index of the non-recorded part of the second organic dye layer 311 is about 2.3 and the refractive index of the recorded part is about 1.5 relative to the optical beam in the vicinity of the wave band of 405±5 nm used for recording and reproducing data.

When the optical beam located in the vicinity of the wave band of 405±5 nm is used as the optical beam for recording and reproducing data, the tripheyl amine tetramer is used as the material forming the second organic dye layer 311 and the thickness of the second organic dye layer 311 is set to a range of 35 nm to 50 nm, the reflectivity of the non-recorded part of the second organic dye layer 311 is 13% or higher. When the thickness of the second organic dye layer 311 is set to 40 nm, the reflectivity of the non-recorded part of the second organic dye layer 311 is about 14%. The second organic dye layer 311 is formed by using the organic dye described in the above-mentioned document 1 as the material. The molecules of this organic dye are designed so that the refractive index in the non-recorded part is about 1.0 and the refractive index in the recorded part is about 1.5 by using the optical beam located in the vicinity of the wave band of 405±5 nm as the optical beam for recording and reproducing data. In this case, the reflectivity of the non-recorded part of the second organic dye layer 311 is 13% or higher when the thickness of the second organic dye layer 311 is located within a range of 75 nm to 105 nm, and about 14% when the thickness of the second organic dye layer 311 is 90 nm.

The reflectivity of the optical beam in the non-recorded part of the second organic dye layer 311 may be 10% or higher under which the data of the second organic dye layer 311 may be recorded and reproduced. When the refractive index of the recorded part of the second organic dye layer 311 is about 1.5, the reflectivity of the second organic dye layer 311 after recording data is substantially 0% or a value near to 0%, because the refractive index of the first board 32 and the second board 34 is about 1.5.

The protective film 312 is a film for preventing the second organic dye layer 311 from dissolving into a below-described pressure sensitive adhesive 36a of the protective film 36. When an $SiO_2$ film is used for the protective film 312, the thickness of the film is preferably 5 nm or larger and 100 nm or smaller, and more preferably 40 nm. When the thickness of the protective film 312 is smaller than 5 nm, adequate protection characteristics, that is, durability is deteriorated. When the thickness of the protective film 312 is larger than 100 nm, the rise of temperature of the first board 32 is caused upon forming the film to degrade the organic dye layer 311 or increase the internal stress of the $SiO_2$ film. Thus, cracks are apt to be easily generated. The $SiO_2$ film forming the protective film 312 gives no optically adverse effect like the $SiO_2$ film in the above-described first embodiment.

The protective film 312 may be made of any other material than the $SiO_2$ film and the SiN film which has a function for preventing the second organic dye layer 311 from being dissolved into the pressure sensitive adhesive. When a material that is hardly dissolved in the pressure sensitive adhesive 313a is selected as a material forming the second organic dye layer 311, the protective film 312 is not necessarily required.

The protective film 36 includes, for instance, a pressure sensitive adhesive 36a (PSA) and a PC (polycarbonate) sheet 36b. The pressure sensitive adhesive 313a of the protective film 36 employs the same adhesive for bonding the first board 12 to the second board 14 used in the optical recording medium 10 shown in FIG. 4.

The thickness of the protective film 36 as the total thickness of the pressure sensitive adhesive 36a and the PC sheet 36b is preferably 80 μm to 120 μm, and more preferably about 100 μm. The thickness of the protective film 36 located within a range of 80 μm to 120 μm falls within a range of an aberration correction by, for instance, a beam expander used for a recording and/or reproducing apparatus. When such an aberration correction can be realized, the same effect can be obtained by any thickness of the film.

The protective film 36 may be formed by using an ultraviolet curing resin.

The second recording layer 33 dedicated for reproducing includes a pit pattern showing data processed by a computer, which is not shown in the drawing, formed on the second board 34 and a reflecting film 331 made of metal such as aluminum for covering the pit pattern. The second recording layer 33 dedicated for reproducing has the same structure as that of the first recording layer 13 dedicated for reproducing provided in the above-described optical recording medium 10.

The refractive index n of the second organic dye layer 311 forming the second recording layer 31 relative to an optical beam whose wavelength is 770 nm to 830 nm employed for reproducing the data of the second recording layer 33 dedicated for reproducing is about 1.3 to 1.7 near to the refractive index of the first board 32 and the second board 34 before and after recording data. The extinction coefficient is substantially 0 or a low value. Therefore, the refractive index is hardly changed to a phase shift resulting from a fact that the optical beam used for reproducing the data of the second recording layer 33 dedicated for reproducing passes through the second organic dye layer 311 forming the second recording layer 31. The second organic dye layer 311 is substantially transparent to the optical beam located in the wave band of 770 nm to 830 nm used for reproducing the data of the second recording layer 33 dedicated for reproducing. That is, the second organic dye layer 311 substantially allows the optical beam located in the wave band of 770 nm to 830 nm to penetrate.

Here, the optical recording medium having the second recording layer 33 dedicated for reproducing based on the standard of the CD-ROM disc is described. However, a recording layer based on the standard of the CD-R disc which has a write-once recording layer using an organic dye may be provided in place of the second recording layer 33 dedicated for reproducing like the optical recording medium 20 shown in FIG. 5.

Now, a method for producing the optical recording medium 30 shown in FIG. 6 will be described below.

In order to produce the optical recording medium 30, the first board 32 which includes the guide grooves forming a part of the second recording layer 31 is formed. The guide grooves provided on the first board 32 are formed in accordance with, for instance, the injection molding method or the photopolymer method (2P method) by using a stamper having an irregular pattern with the pattern form of the guide grooves inverted.

The second board 34 on which the second recording layer 33 dedicated for reproducing is formed as well as the first board 32. On one surface of the second board 34, the pit pattern showing data based on the standard of the CD-R disc is formed in accordance with the injection molding method, the photopolymer method (2P method) or the like by using the stamper having an irregular pattern with this pit pattern inverted.

The first board 32 is bonded to the second board 34 by an adhesive in such a way that the surface opposite to the surface on which the second recording layer 31 is formed and the surface opposite to the surface on which the second recording layer 33 dedicated for reproducing is formed are used as joining surfaces. As the adhesive, the pressure sensitive adhesive or the dry photopolymer sheet used in the optical recording medium 10 shown in FIG. 4 is employed.

Then, on the surface of the second board 34 on which the pit pattern is formed, the reflecting film 331 forming the second recording layer 33 dedicated for reproducing is formed to have the thickness of about 50 nm, by for instance, a sputtering method. Further, for instance, an ultraviolet curing resin is applied to the reflecting film 331 to have the thickness of about 10 μm by a spin coat method. Then, the ultraviolet curing resin layer is irradiated with an ultraviolet ray to form the cured protective layer 35.

Then, on the surface of the first board 32 on which the guide grooves forming a part of the second recording layer 31 is formed, an organic dye film is formed by a deposition or a spin coat method to form a second organic dye layer 311. On the organic dye layer 311, the protective film 312 is formed by, for instance, a reactive sputtering method. To this protective film 312, the PC sheet 36b is bonded through the pressure sensitive adhesive 36a. Thus, the optical recording medium 30 as shown in FIG. 6 that the second recording layer 31 and the second recording layer 33 dedicated for reproducing are laminated through the first board 32 and the second board 34.

In the optical recording medium 30 as shown in FIG. 6, when the second recording layer 31 located at a position near a reading surface as a surface on which an optical beam for recording and reproducing data is incident is irradiated with the optical beam for recording and reproducing the data located in the wave band of 380 nm to 450 nm, the reflectivity on the non-recorded part of the second organic dye layer 311 forming the second recording layer 31 is 10% or higher, and the reflectivity on the recorded part of the second organic dye layer 311 is substantially 0% or a value near to 0%. Therefore, an information signal recorded on the second organic dye layer 311 can be detected by the reflectivity modulation system for directly observing the difference between the actual reflectivities. The information signal is recorded on the second recording layer 31 in such a manner as described below. The second organic dye layer 311 forming the second recording layer 31 is irradiated with the optical beam located in the wave band of 380 nm to 450 nm with a larger output than that upon reproducing so that the second organic dye layer 311 absorbs the optical beam. Thus, a property change of the second organic dye layer 311 is generated to change the refractive index.

In the optical recording medium 30 according to the present invention, the second recording layer 31 having no reflecting film can be reproduced and the second recording layer 33 dedicated for reproducing can be reproduced. That is, the transmittance of the optical beam used for reproducing the data of the second recording layer 33 dedicated for reproducing is at least 90% or higher in the second recording layer 31 having no reflecting film. Even when the optical beam located in the wave band of 770 nm to 830 nm used for reproducing the data of the second recording layer 33 dedicated for reproducing passes through the second recording layer 31 having the second organic dye layer 311, a phase shift rarely arises. Since the second organic dye layer 311 is substantially transparent relative to the optical beam located in the wave band of 770 nm to 830 nm, the reflectivity in the second recording layer 33 dedicated for reproducing can be maintained to 70% or higher. An aberration or the like due to the penetration of the optical beam into the second recording layer 31 hardly arises. Therefore, in the second recording layer 33 dedicated for reproducing, the data can be reproduced with good reproducing characteristics.

The optical recording medium shown in FIG. 6 is mounted on a disc player which uses an optical disc based on the standard of the CD-ROM disc as a recording medium so that the data recorded on the second recording layer 33 dedicated for reproducing can be reproduced. Further, in the optical recording medium, HDTV (High Diffusion Television) data can be recorded and reproduced by using a disc player capable of recording an information signal on the second recording layer 31.

In the optical recording medium 30, a third recording layer 23 formed based on the standard of the CD-R disc is provided in place of the second recording layer 33 dedicated for reproducing, so that an information signal can be recorded and reproduced in a disc player using an optical disc based on the standard of the CD-R disc as a recording medium.

Figure 7:
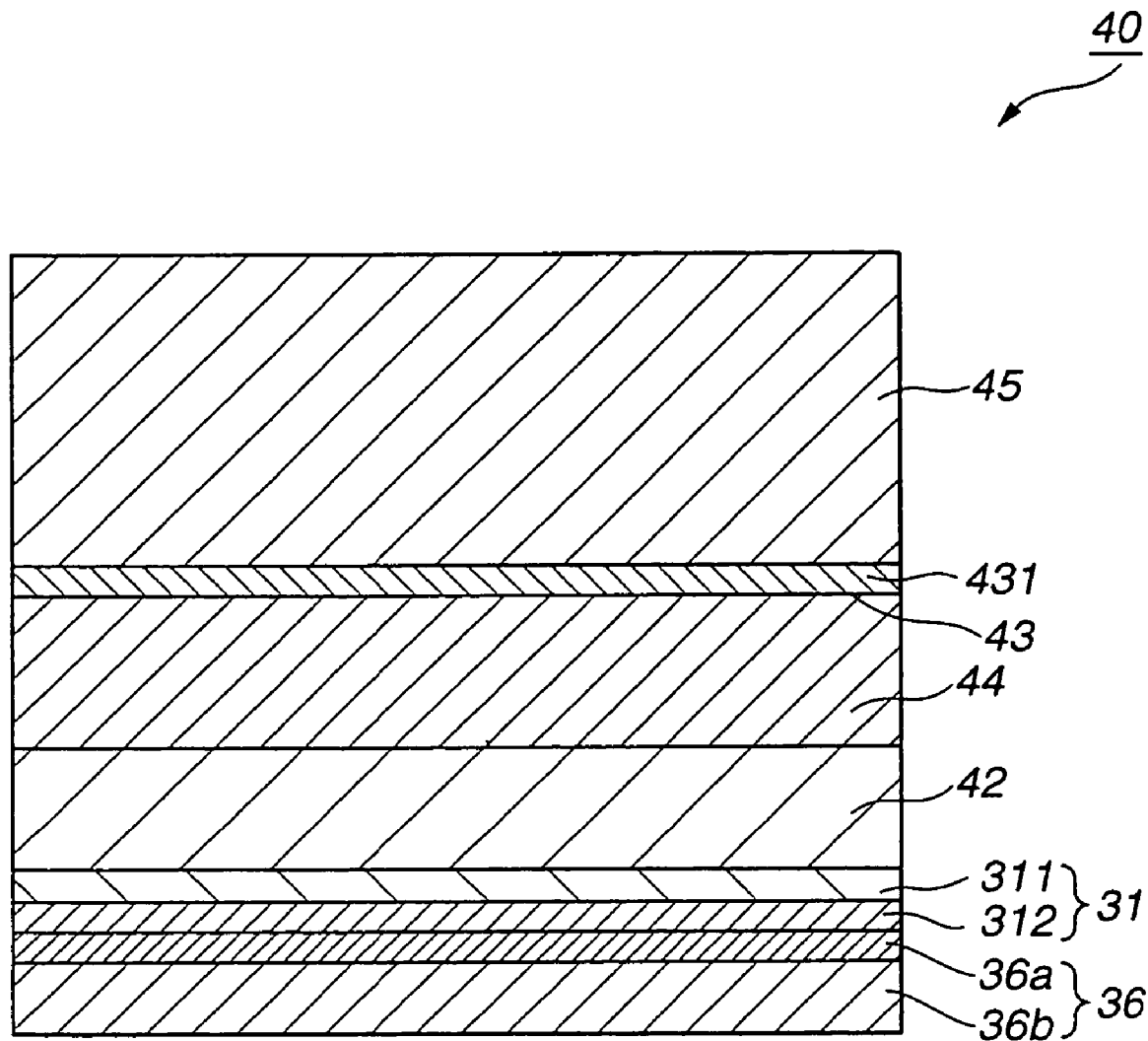
FIG. 7 is a sectional view showing the structure of layers of a still another optical recording medium according to the present invention.

Now, a still another embodiment of the optical recording medium according to the present invention is shown in FIG. 7.

An optical recording medium 40 shown in FIG. 7 comprises a second recording layer 31 having a second organic dye layer 311 in which an information signal recorded by the above-described reflectivity modulation system can be detected by using an optical beam located in the wave band of violet blue having the wavelength of 380 nm to 450 nm for recording and reproducing data like the optical recording medium shown in FIG. 6, a first board 42 as a light transmitting layer on which the second recording layer 31 is formed, a protective film 36 formed on the second recording layer 31, a third recording layer 43 dedicated for reproducing based on the standard of the DVD disc, a second board 44 as a light transmitting layer on which the third recording layer 43 dedicated for reproducing is formed, and a third board 45 as a light transmitting layer to which the second board 44 is bonded.

The first board 42, the second board 44 and the third board 45 are made of materials the same as those of the optical recording medium 10 shown in FIG. 4, especially, polycarbonate (PC).

The total thickness of the first board 42 and the second board 44 including the protective film 36 is preferably about 0.550 mm to 0.653 mm. For example, the thickness of the first board 42 is set to 0.2 mm and the thickness of the second board 44 is set to 0.3 mm. To set the thickness of the third board 45, the total thickness of the first board 42, the second board 44, and the protective film 36 is preferably set to about 1.1 mm to 1.4 mm. For instance, when the thickness of the first board 42 is set to 0.2 mm and the thickness of the second board 44 is set to 0.3 mm, the thickness of the third board 45 is set to 0.6 mm. The refractive index of the first board 42, the second board 44, and the third board 45 is respectively about 1.5. The second recording layer 31 is formed at a position spaced by 80 µm to 120 µm from the plane of incidence on which an optical beam for recording and reproducing data on the optical recording medium 40 is incident. The third recording layer 43 dedicated for reproducing is formed at a position spaced by 0.550 nm to 0.653 nm from the plane of incidence on which the optical beam for recording and reproducing data on the optical recording medium 40 is incident.

On the first board 42, guide grooves forming the second recording layer 31 with a track pitch of 0.32±0.015 µm are formed.

On the surface of the second board 44 on which the third recording layer 43 dedicated for reproducing is provided, a pit pattern showing data based on the standard of the DVD disc is formed.

In the optical recording medium 40 shown in FIG. 7, the surface of the first board 42 on which the guide grooves forming the second recording layer 31 are formed serves as a reading surface for the second recording layer 31 and the third recording layer 43 dedicated for reproducing.

The second recording layer 31 includes the guide grooves, which are not shown in the drawing, formed on the first board 42, the second organic dye layer 311 formed on the guide grooves, and a protective film 312 for protecting the second organic dye layer 311 like the optical recording medium 30 shown in FIG. 6. The protective film 36 is formed of a pressure sensitive adhesive 36a and a PC sheet 36b like the optical recording medium 30 shown in FIG. 6.

The third recording layer 43 dedicated for reproducing includes the pit pattern showing the data based on the standard of the DVD disc, which is not shown in the drawing, formed on the second board 44, and a reflecting film 431 made of metal such as aluminum for covering the pit pattern.

Now, a method for producing the optical recording medium 40 shown in FIG. 7 will be described below. In order to produce the optical recording medium 40, the second board 44 on which the third recording layer 43 dedicated for reproducing is formed is firstly formed. On the surface of the second board 44 on which the third recording layer 43 dedicated for reproducing is formed, the pit pattern showing the data based on the standard of the DVD disc is formed in accordance with, for instance, the injection molding method, the photopolymer method (2P method) or the like by using a stamper having an irregular pattern with the pit pattern inverted. On the surface of the second board 44 on which the pit pattern is formed, the metallic reflecting film is formed by a sputtering method so as to cover the pit pattern. Thus, the third recording layer 43 dedicated for reproducing is formed.

To the surface of the second board 44 on which the third recording layer 43 dedicated for reproducing is formed, the third board 45 is bonded by using an adhesive such as a pressure sensitive adhesive or a dry photopolymer sheet.

Then, on the surface of the first board 42 on which the guide grooves forming a part of the second recording layer 31 are formed, an organic dye film is formed by a deposition method or a spin coat method to form the second dye layer 311. On this organic dye layer 311, the protective film 312 is formed by, for instance, a reactive sputtering method.

Then, a surface of the first board 42 opposite to the surface on which the second recording layer 31 is formed is bonded to a surface of the second board 44 opposite to the surface on which the third recording layer 43 dedicated for reproducing is formed by an adhesive. As the adhesive, for instance, the pressure sensitive adhesive or the dry photopolymer sheet is employed.

Subsequently, on the protective film 312 formed on the first board 42, the PC sheet 36b is bonded by using the pressure sensitive adhesive 36a like the optical recording medium 30 shown in FIG. 6 to form the protective film 36. Thus, the optical recording medium 40 in which the second recording layer 31 and the third recording layer 43 dedicated for reproducing are laminated is completed.

In the optical recording medium 40 according to the present invention shown in FIG. 7, an information signal can be recorded on the second recording layer 31 having the second organic dye layer 311 having no reflecting film. The information signal recorded on the second recording layer 31 can be reproduced. Further, an information signal recorded on the third recording layer 43 dedicated for reproducing can be reproduced with good reproducing characteristics. That is, the transmittance of an optical beam used for reproducing the information signal of the third recording layer 43 dedicated for reproducing becomes at least 50% or higher in the second recording layer 31 having no reflecting film. The refractive index of an optical beam having the wavelength of 635 nm to 660 nm used for reproducing the data of the third recording layer 43 dedicated for reproducing is about 1.3 to 1.7 in the second organic dye layer 311 forming the second recording layer 31. This refractive index is near to the refractive index of the boards before and after recording data on the second dye layer 311. The extinction coefficient of the optical beam is substantially 0 or a small value. Accordingly, the optical beam used for reproducing the data of the third recording layer 43 dedicated for reproducing hardly changes its refractive index to generate a phase shift due to passing through the second organic dye layer 311. The second organic dye layer 311 is substantially transparent to the optical beam located in the wave band of 635 nm to 660 nm used for reproducing the data of the third recording layer 43 dedicated for reproducing. Accordingly, the reflectivity of the optical beam for reproducing the data in the third recording layer 43 dedicated for reproducing can be maintained to 10% or higher. Further, an aberration or the like due to a fact that the optical beam penetrates the second recording layer 31 having the second organic dye layer 311 hardly arises. Therefore, the information signal recorded on the third recording layer 43 dedicated for reproducing can be reproduced with good reproducing characteristics.

When the optical recording medium 40 shown in FIG. 7 is mounted on a disc player which employs an optical disc based on the standard of the DVD disc as a recording medium, the information signal such as a video signal recorded on the third recording layer 43 dedicated for reproducing can be reproduced. Further, in the optical recording medium 40, HDTV data can be recorded and reproduced by using a disc player capable of recording an information signal on the second recording layer 31.

Figure 8:
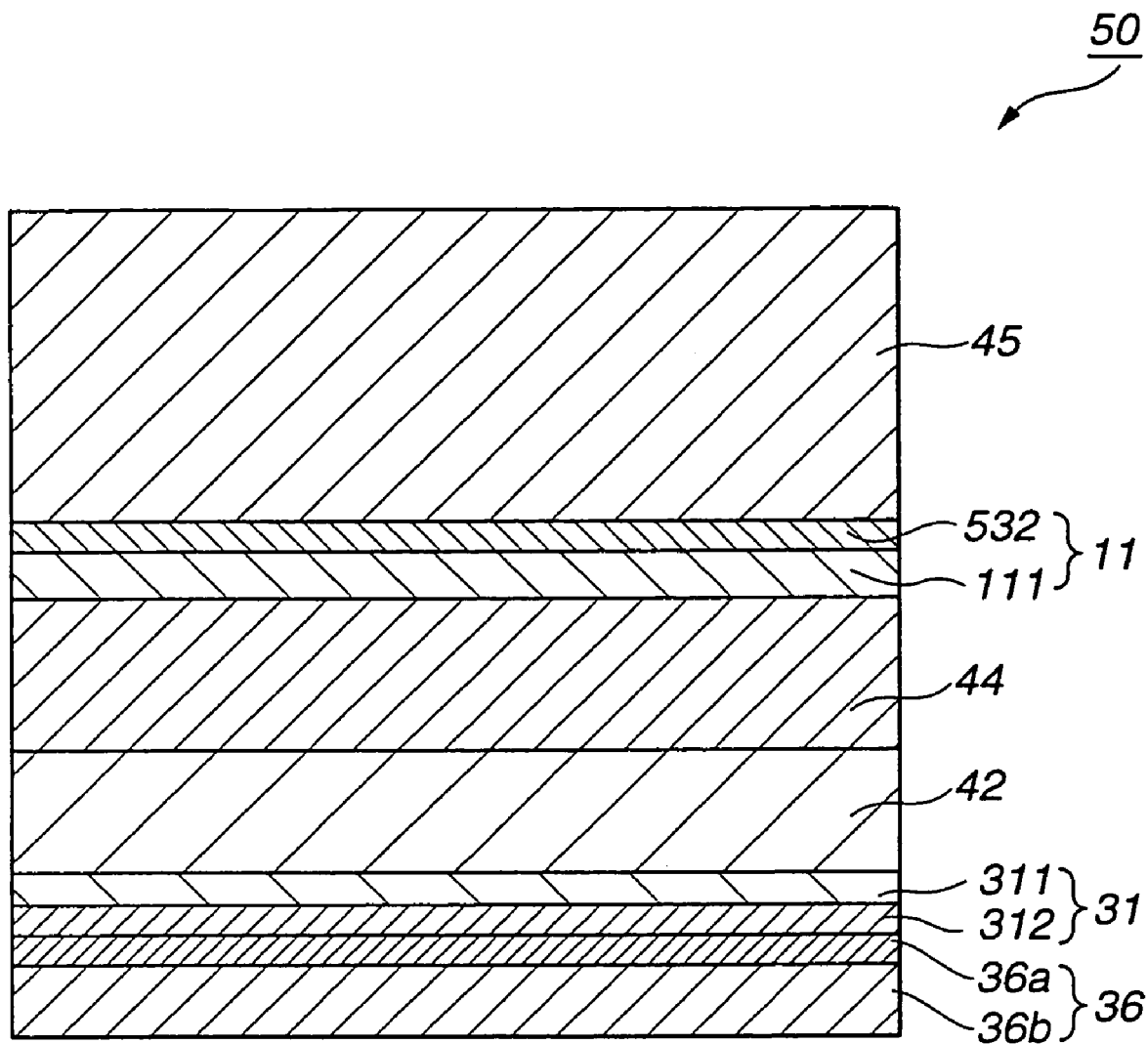
FIG. 8 is a sectional view showing the structure of layers of a still another optical recording medium according to the present invention.

Now, a further embodiment of the optical recording medium according to the present invention is shown in FIG. 8.

An optical recording medium 50 shown in FIG. 8 includes the first recording layer 11 based on the standard of the DVD disc, especially based on the standard of the DVD-R disc provided in the optical recording medium 10 shown in FIG. 4 in place of the third recording layer 43 dedicated for reproducing based on the standard of the DVD disc provided in the optical recording medium 40 shown in FIG. 7. The first recording layer 11 includes guide grooves, which are not shown in the drawing, formed on a second board 44, and a first organic dye layer 111 formed on the guide grooves like the optical recording medium 10 shown in FIG. 4. In this case, the first recording layer 11 provided in the optical recording medium 50 shown in FIG. 8 does not have a protective film and has a reflecting film 532 made of, for instance, aluminum.

Now, a method for producing the above-described optical recording medium 50 shown in FIG. 8 will be described below. In order to produce the optical recording medium 50, the second board 44 on which the guide grooves forming the first recording layer 11 are formed is firstly formed. The guide grooves provided on the second board 44 are formed in accordance with, for instance, the injection molding method, the photopolymer method (2P method) or the like by using a stamper on which an irregular pattern with the pattern form of the guide grooves inverted is formed. Then, on the surface of the second board 44 on which the guide grooves are formed, an organic dye is applied by, for instance, a spin coat method or a deposition method to form the first organic dye layer 111. On this organic dye layer 111, aluminum is sputtered to form the reflecting film 532.

The optical recording medium 50 shown in FIG. 8 is produced through the same producing steps as those of the optical recording medium 40 shown in FIG. 7, after the first recording layer 11 is formed on the second board 44.

In the optical recording medium 50 shown in FIG. 8, an information signal can be recorded and reproduced on a second recording layer 31 having a second organic dye layer 311 having no reflecting film. The information signal can be recorded and reproduced likewise on the first recording layer 11. That is, an optical beam used for recording and reproducing the data of the first recording layer 11 having the first organic dye layer 111 formed based on the standard of the DVD disc has a transmittance of at least 50% or more on the second recording layer 31 having no reflecting film. Further, the refractive index of an optical beam located in the wave band of 635 nm to 660 nm used for the first recording layer 11 in the second organic dye layer 311 is about 1.3 to 1.7. This refractive index is near to the refractive index of the second board 44 before and after recording data on the second organic dye layer 311. The extinction coefficient of the optical beam is substantially 0 or a small value. Therefore, the optical beam used for recording and reproducing the data of the first recording layer 11 hardly changes its refractive index to generate a phase shift due to the penetration of the second organic dye layer 311. The second organic dye layer 311 is substantially transparent to the optical beam located in the wave band of 635 nm to 660 nm used for recording and reproducing the data of the first recording layer 11. Accordingly, the reflectivity of the optical beam used for recording and reproducing the data of the first recording layer 11 can be maintained to 10% or higher. Further, an aberration or the like due to a fact that the optical beam penetrates the second recording layer 31 hardly arises. Therefore, the information signal can be recorded and reproduced on the first recording layer 11 with good recording and reproducing characteristics.

When the optical recording medium 50 shown in FIG. 8 is mounted on a disc player which employs an optical disc based on the standard of the DVD disc as a recording medium, the information signal such as a video signal can be recorded and reproduced on the first recording layer 11. Further, in the optical recording medium 50, HDTV (High Diffusion Television) data can be recorded and reproduced by using a disc player capable of recording an information signal on the second recording layer 31.

Figure 9:
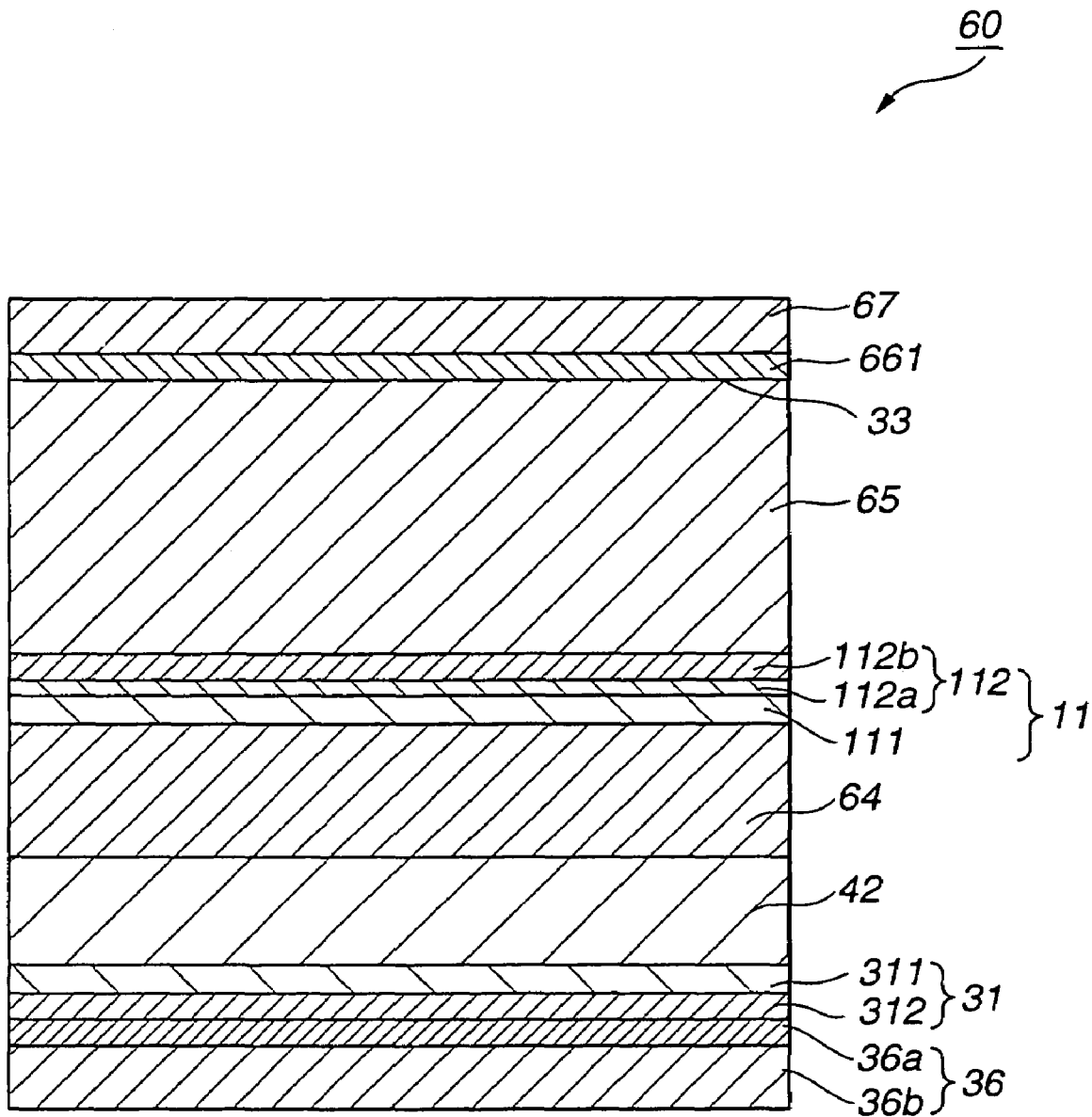
FIG. 9 is a sectional view showing the structure of layers of a still another optical recording medium according to the present invention.

Now, a still further embodiment of the optical recording medium according to the present invention is shown in FIG. 9.

An optical recording medium 60 shown in FIG. 9 comprises a second recording layer 31 having a second organic dye layer 311 in which an information signal can be detected, which is recorded by the reflectivity modulation system by using an optical beam of violet blue color located in the wave band of 380 nm to 450 nm for recording and reproducing data, a first recording layer 11 based on the standard of the DVD-R disc, and a second recording layer 33 dedicated for reproducing based especially on the standard of the CD-ROM disc of the standards of the CD discs on which data capable of being processed by a computer is recorded.

More specifically, the optical recording medium 60 shown in FIG. 9 comprises the second recording layer 31, a first board 42, the first recording layer 11, a second board 64 as a light transmitting layer on which the first recording layer 11 is formed, the second recording layer 33 dedicated for reproducing, a third board 65 as a light transmitting layer on which the second recording layer 33 dedicated for reproducing is formed, and a protective layer 67 made of an ultraviolet curing resin.

The second board 64 has the same structure as the structure of the second board 44 forming the optical recording medium 40 shown in FIG. 7 except that guide grooves forming the first recording layer 11 is formed. Further, the third board 65 has the same structure as the structure of the third board 45 forming the optical recording medium 40 shown in FIG. 7 except that a pit pattern showing data formed in the second recording layer 33 dedicated for reproducing is formed. The second recording layer 31 is formed at a position spaced by 80 μm to 120 μm from a plane of incidence on which an optical beam for recording and reproducing the data of the optical recording medium 60 is incident. The first recording layer 11 is formed at a position spaced by 0.550 nm to 0.653 nm from the plane of incidence on which the optical beam for recording and reproducing the data of the optical recording medium 60 is incident. The second recording layer 33 dedicated for reproducing is formed at a position spaced by 1.10 mm to 1.40 mm from the plane of incidence on which the optical beam for recording and reproducing the data of the optical recording medium 60 is incident.

The first recording layer 11 provided in the optical recording medium 60 shown in FIG. 9 comprises guide grooves, which are not shown in the drawing, formed on the second board 64, an organic dye layer 111 formed on the guide grooves, and a protective film 112 as a dielectric layer composed of, for instance, an SiN film 112a and an SiO$_2$ film 112b for protecting the organic dye layer 111, like the optical recording medium 10 shown in FIG. 4. The first recording layer 11 provided in the optical recording medium 60 shown in FIG. 9 has no reflecting film.

The second recording layer 33 dedicated for reproducing includes a pit pattern showing data based on the standard of the CD-R disc, which is not shown in the drawing, formed on the third board 65, and a reflecting film 661 made of metal such as aluminum for covering the pit pattern. The optical recording medium 60 shown in FIG. 9 may be provided with a third recording layer 23 based on the standard of the CD-R disc provided in the optical recording medium 20 shown in FIG. 5 in place of the second recording layer 33 dedicated for reproducing.

Now, a method for producing the optical recording medium 60 shown in FIG. 9 will be described below.

In order to produce the optical recording medium 60 shown in FIG. 9, the second recording layer 33 dedicated for reproducing and the protective layer 67 are formed on the third board 65 like a case in which the optical recording medium 10 shown in FIG. 4 is formed. On the other hand, the first recording layer 11 is formed on the second board 64 like a case in which the optical recording medium 10 shown in FIG. 4 is formed. The second board 64 is bonded to the third board 65 in such a way that the surface on which the first recording layer 11 is formed is bonded to a surface opposite to the surface on which the second recording layer 33 dedicated for reproducing and the protective layer 67 are formed by an adhesive. Then, the second recording layer 31 and a protective film 36 composed of a pressure sensitive adhesive 36a and a PC sheet 36b are formed to produce the optical recording medium 60 shown in FIG. 9 through the same producing steps as those of the optical recording medium 40 shown in FIG. 7.

In the optical recording medium 60 according to the present invention shown in FIG. 9, an information signal can be recorded and reproduced on the second recording layer 31 having the second organic dye layer 311 with no reflecting film. The information signal can be also recorded and reproduced on the first recording layer 11 having no reflecting film. Further, an information signal recorded on the second recording layer 33 dedicated for reproducing can be reproduced. That is, the transmittance of an optical beam used for reproducing the data of the second recording layer 33 dedicated for reproducing becomes at least 90% or higher respectively in the second recording layer 31 and the first recording layer 11 having no reflecting film. The refractive index of the optical beam located in the wave band of 770 nm to 830 nm used for reproducing the data of the second recording layer 33 dedicated for reproducing in the second organic dye layer 311 forming the second recording layer 31 and the first organic dye layer 111 forming the first recording layer 11 is about 1.3 to 1.7 near to the refractive index of the first board 42 and the second board 64, under states before and after recording data. The extinction coefficient of the optical beam is substantially 0 or a low value. Accordingly, the optical beam used for reproducing the second recording layer 33 dedicated for reproducing hardly changes its refractive index due to passing through the second organic dye layer 311 forming the second recording layer 31 and the first organic dye layer 111 forming the first recording layer 11 to generate a phase shift. The second organic dye layer 311 and the first organic dye layer 111 function as transparent bodies for substantially transmitting the optical beam located in the wave band of 770 nm to 830 nm used for reproducing the data of the second recording layer 33 dedicated for reproducing. Therefore, the reflectivity of the optical beam used for reproducing the data of the second recording layer 33 dedicated for reproducing can be maintained to 70% or higher. An aberration due to the penetration of the optical beam through the second recording layer 31 and the first recording layer 11 hardly arises. Therefore, the data of the second recording layer 33 dedicated for reproducing can be reproduced with good reproducing characteristics.

An optical beam used for recording and reproducing the first recording layer 11 has a transmittance of at least 50% or higher in the second recording layer 31 having no reflecting film. The refractive index of an optical beam located in the wave band of 635 nm to 660 nm used for recording and reproducing the first recording layer 11 in the second organic dye layer 311 is about 1.3 to 1.7 near to the refractive index of the first board 42 and the second board 64 or the like before and after recording the data. The extinction coefficient of the optical beam is substantially 0 or a low value. Consequently, the optical beam used for recording and reproducing the data of the first recording layer 11 hardly changes its refractive index due to passing through the second organic dye layer 311 to generate a phase shift. Further, the second organic dye layer 311 substantially transmits the optical beam located in the wave band of 635 nm to 660 nm used for recording and reproducing the first recording layer 11. That is, the second organic dye layer 311 functions as a light transmitting layer for the optical beam used for recording and reproducing the data of the first recording layer 11. Accordingly, the reflectivity of the optical beam used for recording and reproducing the data in the first recording layer 11 can be maintained to 10% or higher and an aberration due to the penetration of the optical beam trough the second recording layer 31 hardly arises. Therefore, an information signal recorded on the first recording layer 11 can be reproduced with good reproducing characteristics.

When the optical recording medium 60 shown in FIG. 9 is mounted on a disc player using an optical disc based on the standard of the CD disc as a recording medium, audio information can be recorded and reproduced on the second recording layer 33 dedicated for reproducing. When the optical recording medium 60 is mounted on a disc player using an optical disc based on the standard of the DVD disc as a recording medium, an information signal such as a video signal can be recorded and reproduced on the first recording layer 11. A disc player capable of recording an information signal on the second recording layer 31 is used so that HDTV data can be recorded and reproduced.

Figure 10:
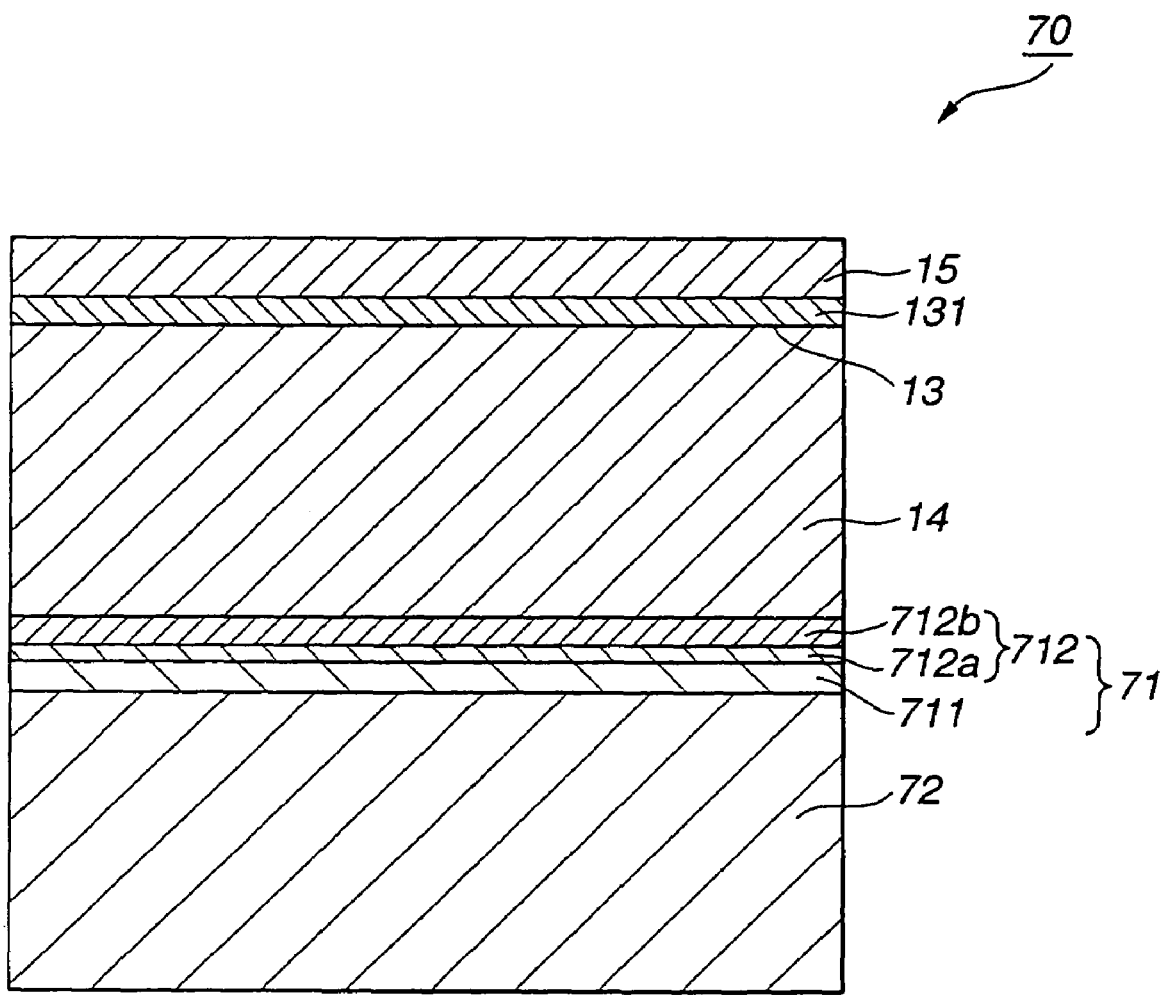
FIG. 10 is a sectional view showing the structure of layers of a still another optical recording medium according to the present invention.

Now, a still further embodiment of the optical recording medium 70 according to the present invention is shown in FIG. 10.

An optical recording medium 70 shown in FIG. 10 has a fourth recording layer 71 dedicated for reproducing especially based on the standard of the DVD-ROM disc of the standards of the DVD discs on which data capable of being processed by a computer is recorded in place of the first recording layer 11 based on the standard of the DVD disc provided in the optical recording medium 10 shown in FIG. 4. The fourth recording layer 71 dedicated for reproducing includes a pit pattern showing data based on the standard of the DVD disc formed on one surface of the first board 72 as a light transmitting layer, an organic dye layer 711 functioning as a reflecting film provided for covering the pit pattern, and a protective film 712.

The first board 72 has the same structure as the structure of the first board 12 forming the optical recording medium 10 shown in FIG. 4 except that the pit pattern forming the fourth recording layer 71 dedicated for reproducing is provided.

The organic dye layer 711 functioning as a reflecting film of the fourth recording layer 71 dedicated for reproducing has the same structure as the structure of the first organic dye layer 111 forming the first recording layer 11 provided in the optical recording medium 10 shown in FIG. 4. The organic dye layer 711 has a refractive index of about 2.5 relative to an optical beam located in the wave band of 635 nm to 660 nm used for reproducing the data of the fourth recording layer 71 dedicated for reproducing. The refractive index of the optical beam in the first board 72 and a second board 14 is about 1.5. The protective film 712 also has the same structure as the structure of the protective film 112 provided in the optical recording medium 10 shown in FIG. 4, and has, for instance, a dielectric layer composed of, for instance, an SiN film 712a and an $SiO_2$ film 712b.

The reflectivity of the organic dye layer 711 functioning as the reflecting film is 15% or higher relative to an optical beam having the wavelength of, for instance, about 650 nm when the thickness of the film ranges from 45 nm to 80 nm. When the thickness of the film is 65 nm, the reflectivity is about 20%. The reflectivity of the optical beam of the organic dye layer 711 may be 10% or higher required for reading data recorded on the fourth recording layer 71 dedicated for reproducing.

Now, a method for producing the optical recording medium 70 shown in FIG. 10 will be described below. In order to form the optical recording medium 70, a pit pattern showing data based on the standard of the DVD-ROM disc is formed on one surface of the first board 72 in accordance with, for instance, an injection molding method, a 2P method or the like by using a stamper on which a pit pattern corresponding thereto is formed.

An organic dye film is formed on the surface of the first board 72 on which the pit pattern is formed by, for instance, a spin coat method or a deposition method to form the organic dye layer 711. Here, when the organic dye layer 711 is formed by the deposition method, the thickness of the film is uniform. As a result, the reflectivity is constant, so that the fourth recording layer 71 dedicated for reproducing can obtain good reproducing characteristics.

After the fourth recording layer 71 dedicated for reproducing is formed on the first board 72, the optical recording medium 70 shown in FIG. 10 is formed through the same steps as those of the optical recording medium 10 shown in FIG. 4. Accordingly, a detailed explanation is omitted.

In the optical recording medium 70 shown in FIG. 10, the reflection of an optical beam used for reproducing the data of the fourth recording layer 71 dedicated for reproducing is generated on the interface between the organic dye layer 711 as the reflecting film and the second board 14. The reflectivity can be maintained to 10% or higher. As described above, since the organic dye layer 711 serves as the reflecting film, the data recorded on the fourth recording layer 71 dedicated for reproducing can be detected by a phase modulation system.

Since the fourth recording layer 71 dedicated for reproducing has no metallic reflecting film, the transmittance of an optical beam used for reproducing the data of a first recording layer 13 dedicated for reproducing provided in the optical recording medium 70 shown in FIG. 10 can be maintained to 90% or more. The refractive index of an optical beam located in the wave band of 770 nm to 830 nm used for reproducing the data of the first recording layer 13 dedicated for reproducing in the organic dye layer 711 functioning as the reflecting film is about 1.3 to 1.7 near to the refractive index of the first board 72 forming the optical recording medium 70. The extinction coefficient of the optical beam is substantially 0 or a low value. Consequently, the optical beam used for reproducing the data of the first recording layer 13 dedicated for reproducing hardly changes its refractive index due to passing through the organic dye layer 711 functioning as the reflecting film to generate a phase shift. Further, the organic dye layer 711 functioning as the reflecting film substantially transmits the optical beam located in the wave band of 770 nm to 830 nm used for reproducing the data of the first recording layer 13 dedicated for reproducing. Accordingly, the reflectivity of the optical beam used for reproducing the data in the first recording layer 13 dedicated for reproducing can be maintained to 70% or higher. An aberration due to the penetration of the optical beam through the fourth recording layer 71 dedicated for reproducing hardly arises. Therefore, the reproducing characteristics of the first recording layer 13 dedicated for reproducing can be maintained in a good state.

In the optical recording medium 70 shown in FIG. 10, a disc player using an optical disc based on the standard of the DVD disc as a recording medium is employed, so that an information signal such as a video signal recorded on the fourth recording layer 71 dedicated for reproducing can be reproduced. A disc player using an optical disc based on the standard of the CD disc as a recording medium is employed. Thus, an information signal such as audio information recorded on the first recording layer 13 dedicated for reproducing can be reproduced. Further, a disc player capable of using an optical disc respectively based on the standards of the DVD and CD discs is employed, so that information signals recorded on the first and fourth recording layers 13 and 71 dedicated for reproducing can be selectively reproduced by a common disc player.

The organic dye layer forming the first recording layer 11 provided in the optical recording medium 20 shown in FIG. 5, the organic dye layer forming the second recording layer 31 provided in the optical recording medium 30 shown in FIG. 6, the organic dye layers forming the second recording layers 31 respectively provided in the optical recording media 40, 50 and 60 shown in FIGS. 7 to 9, and the organic dye layer forming the first recording layer 11 provided in the optical recording medium 60 shown in FIG. 9 may be used as the reflecting films. Thus, the respective recording layers may be formed as the recording layers dedicated for reproducing.

Although the present invention is described by way of the above-mentioned seven embodiments, the present invention is not limited to the seven embodiments and various modifications may be carried out. For example, although, in the above-description, the information of the information recording layer having the layer composed of an organic dye provided in each optical recording medium is reproduced by the reflectivity modulation system, the phase shift may arise even in accordance with the reflectivity modulation. Thus, the information may be reproduced by the above-described phase modulation system.

Although, in the above-described embodiment, the guide grooves forming each recording layer or the pit pattern showing the recorded data are formed on one surfaces of the boards and the respective boards are bonded together, the guide grooves or the like may be formed on both the surfaces of one board.

Further, although, in the above-described embodiments, the optical recording media 40 and 50 shown in FIGS. 7 and 8 have two layers including the second recording layer 31 and the third recording layer 43 dedicated for reproducing or the first recording layer 11, the two layers including the second recording layer 31 and the third recording layer 43 dedicated for reproducing or the first recording layer 11 may be further added to a surface opposite to the reading surface of the optical recording medium. Accordingly, a four-layer optical recording medium capable of recording and reproducing data from both surfaces may be formed. Thus, more information can be recorded and reproduced.

The optical recording medium according to the present invention may be provided with a recording layer based on the standard of the CD-ROM disc capable of recording and reproducing an information signal as a recording layer based on the standard of the CD disc.

Further, although, in the above-described embodiments, the optical recording media 40 and 50 shown in FIGS. 7 and 8 have the third recording layer 43 dedicated for reproducing as the recording layer based on the standard of the DVD disc and the first recording layer 11, recording layers based on the standards of discs such as DVD-RAM, DVD+RW, DVD-RW, etc. may be provided.

Now, specific Examples of the present invention will be further described below. It is to be noted that the present invention is not limited to respective Examples.

FIRST EXAMPLE

An optical recording medium according to a first Example corresponds to the above-described optical recording medium 10 shown in FIG. 4. The optical recording medium includes a first recording layer having a first organic dye layer based on the standard of the DVD disc and a first recording layer dedicated for reproducing based on the standard of the CD disc. In this optical recording medium, guide grooves forming the first recording layer was formed on a polycarbonate board having the thickness of 0.6 mm in accordance with an injection molding method by a stamper on which an irregular pattern corresponding to the guide grooves forming the first recording layer which had a track pitch of 0.74 μm, the depth of groove of 60 nm, and a track width of 0.35 μm. On the PC board on which the guide grooves were formed, "NK-4295" (trade name: Nippon Kanko Shikiso Kenkyusho Co., Ltd.) as an organic dye forming a recording layer based on the DVD-R was applied by a spin coat method to have the thickness of the organic dye layer of 65 nm. In the optical recording medium of the first Example, the thickness of the organic dye layer in a groove part is 65 nm. On the organic dye layer, an SiN film of the thickness of 5 nm and an $SiO_2$ film of the thickness of 30 nm were formed by a reactive sputtering method. A pit pattern showing data recorded on the first recording layer dedicated for reproducing was formed on the polycarbonate board having the thickness of 0.6 mm by using a stamper. An aluminum reflecting film was formed with the thickness of 50 nm on the polycarbonate board on which the pit pattern was formed by a sputtering method. An ultraviolet curing resin was applied thereon to have the thickness of 10 μm by a spin coat method and then, cured. The polycarbonate board on which the first recording layer dedicated for reproducing was bonded to the polycarbonate board on which the first recording layer was formed by an adhesive.

For the optical recording medium formed in such a manner, an experiment for reproducing an information signal recorded on the first recording layer dedicated for reproducing was firstly carried out by using an optical pick-up having an optical beam having the wavelength of 780 nm and an objective lens with a numerical aperture NA of 0.45. As a result, the information signal could be reproduced by a disc player using an optical disc based on the standard of an ordinary CD disc as a recording medium. The reflectivity of the optical beam having the wavelength of 780 nm on the first recording layer dedicated for reproducing was 75%. Thus, it was understood that the transmittance of the optical beam having the wavelength of 780 nm in the first recording layer dedicated for reproducing was at least 90% or more.

Then, an experiment for recording and reproducing an information signal on the first recording layer of the optical recording medium was carried out by using an optical pick-up having a light source for emitting an optical beam having the wavelength of 650 nm and an objective lens with the numerical aperture NA of 0.60. The reflectivity of the optical beam reflected from the groove part of the first recording layer was 17%. A single carrier recording having the mark length of 0.8 μm in which recording linear velocity was 3 m/s and a recording power was 8 mW was performed. C/N ratio (Carrier to Noise Ratio) was measured by using TR4171 (trade name: produced by Takeda Riken). RBW (Resolution Band Width) was 30 KHz. Consequently, the C/N ratio of 50 dB was obtained. In such a way, the recording and reproducing principle of the first recording layer could be proved.

SECOND EXAMPLE

An optical recording medium according to the second Example corresponds to the optical recording medium shown in FIG. 5. The optical recording medium includes a first recording layer and a third recording layer formed based on the standard of the CD-R disc. Firstly, the first recording layer was formed on a polycarbonate board having the thickness of 0.6 mm in the same manner as that of the first Example. On the other hand, guide grooves forming the third recording layer were formed on a polycarbonate board having the thickness of 0.6 mm by using a stamper. An organic dye layer forming the third recording layer was formed on the polycarbonate board on which the guide grooves were formed. This organic dye layer was formed by applying "OM-57" (trade name: produced by Fuji Photo Film Co., Ltd.) as an organic dye in accordance with a spin coat method to have the thickness of 200 nm. On this organic dye layer, a silver (Ag) reflecting film was formed to have the thickness of 50 nm by a sputtering method. Further, an ultraviolet curing resin was applied by a spin coat method to have the thickness of 10 μm. Then, the ultraviolet curing resin layer was irradiated with an ultraviolet ray and cured to form a protective film. The polycarbonate board on which the third recording layer was formed was bonded to the polycarbonate board on which the first recording layer was formed by an adhesive.

For the optical recording medium formed as described above, an experiment for recording and reproducing an information signal on the first recording layer of the optical recording medium was carried out by using an optical pick-up having a light source for emitting an optical beam having the wavelength of 650 nm and an objective lens with the numerical aperture NA of 0.60. As a result, the same effects as those of the optical recording medium of the first Example could be obtained.

When this optical recording medium was mounted on a disc player using a CD-R as a recording medium, this disc player also recognized the optical recording medium of the second Example like the ordinary CD-R and data could be recorded and reproduced similarly to the ordinary CD-R.

THIRD EXAMPLE

An optical recording medium according to a third embodiment corresponds to the above-described optical recording medium shown in FIG. 6. The optical recording medium includes a second recording layer using an optical beam having the short wavelength of 380 nm to 450 nm used for recording and reproducing data, and a second recording layer dedicated for reproducing. On a polycarbonate board on which the second recording layer is provided, guide grooves having a track pitch of 0.32 μm are provided. The guide grooves are formed on the polycarbonate board having the thickness of 0.6 mm in accordance with an injection molding method by a stamper on which an irregular pattern corresponding to the guide grooves is formed. On the other hand, in a polycarbonate board having the thickness of 0.5 mm on which the second recording layer dedicated for reproducing is provided, a pit pattern showing data based on the standard of the CD disc to be recorded on the second recording layer dedicated for reproducing is formed.

The polycarbonate board on which the guide grooves forming the second recording layer were formed was bonded to the polycarbonate board on which the pit pattern showing data recorded on the second recording layer dedicated for reproducing in such a way that surfaces opposite to the surfaces on which the guide grooves and the pit pattern were respectively formed were butted upon to each other and integrally bonded together by using a transparent adhesive. Then, on the polycarbonate board on which the pit pattern of the second recording layer dedicated for reproducing was formed, an aluminum reflecting film was formed to have the thickness of 50 nm by a sputtering method. On the aluminum reflecting film, an ultraviolet curing resin was applied on the aluminum reflecting film. This ultraviolet curing resin layer was irradiated with an ultraviolet ray and cured to form a protective film having the thickness of 10 μm. Then, on the polycarbonate board on which the second recording layer was formed, a triphenyl amine tetramer film was formed to have the thickness of 40 nm by a deposition method. Thus, a second organic dye layer forming the second recording layer was formed. On the second organic dye layer using the triphenyl amine tetramer, a protective film made of $SiO_2$ was formed with the thickness of 40 nm by a reactive sputtering method. Further, on the $SiO_2$ protective film, a polycarbonate sheet was bonded by using a pressure sensitive adhesive. At this time, the polycarbonate sheet was bonded to the protective film so that the total thickness of the polycarbonate sheet and the pressure sensitive adhesive was 100 μm.

In the above-described triphenyl amine tetramer, the absorption peak of light was located in a shorter wavelength side than 400 nm, a refractive index under the wavelength of 405 nm was 2.31 and an absorption coefficient was 0.31. This triphenyl amine tetramer has a refractive index of about 1.6 relative to light having the wavelength of 780 nm and an absorption coefficient of 0.

When the optical recording medium formed as described above was mounted on a disc player based on the standard of the CD disc, an experiment for reproducing data of the second recording layer dedicated for reproducing was carried out. Thus, an information signal such as music information recorded on this recording layer could be reproduced without difficulty. Therefore, the second organic dye layer forming the second recording layer near to a reading surface made of the triphenyl amine tetramer which used an optical beam located in the wave band of violet blue of 380 nm to 450 nm for recording and reproducing data was not sensitive to an optical beam having the wavelength of 780 nm for reproducing data of the second recording layer dedicated for reproducing.

An experiment was performed for recording and reproducing an information signal on the second recording layer composed of the organic dye layer made of the triphenyl amine tetramer provided in this optical recording medium. This experiment was carried out by using a disc player (produced by Pulstec Industrial Co., Ltd.) having an optical pick-up including a light source for emitting an optical beam of 404 nm as an optical beam for recording and reproducing data, and an objective lens having a numerical aperture NA of 0.85. In this experiment, a single carrier recording with the mark length of 0.69 μm was carried out on the organic dye layer to measure a C/N ratio. The measuring conditions of the C/N ratio are the same as those of the first Example. The reflectivity of the optical beam from the second organic dye layer before recording data was 14%. The peak power of the optical beam upon recording was 5.5 mW. Seven pulse trains having the same width were incident into one mark with a pulse/space ratio of 50% to record data. As a result, good results that both lands and grooves were 54 dB could be obtained. It was completely understood that the second organic dye layer forming the second recording layer was an organic dye layer which was not influenced by an optical beam having the wavelength of 80 μm.

FOURTH EMBODIMENT

An optical recording medium according to a fourth Example corresponds to the optical recording medium 40 shown in FIG. 7. The optical recording medium includes a second recording layer having a second organic dye layer using an optical beam having the short wavelength of 380 nm to 450 nm for recording and reproducing data and a third recording layer dedicated for reproducing based on the standard of the DVD disc.

On a polycarbonate board having the thickness of 0.3 mm on which the third recording layer dedicated for reproducing forming the optical recording medium is formed, a pit pattern showing an information signal based on the standard of the DVD disc which was recorded to the third recording layer dedicated for reproducing was formed by employing a stamper. On the surface of the polycarbonate board on which the pit pattern was formed, an aluminum reflecting film was formed by a sputtering method. To the polycarbonate board on which the aluminum reflecting film was formed, a separately prepared polycarbonate board having the thickness of 0.6 mm was bonded by using an adhesive.

On a polycarbonate board on which the second recording layer is provided, guide grooves having a track pitch of 0.32

μm are formed. The guide grooves are formed on the polycarbonate board having the thickness of 0.6 mm in accordance with an injection molding method by using a stamper on which an irregular pattern corresponding to the guide grooves is formed. A triphenyl amine tetramer film was formed on the surface of the polycarbonate board having the second recording layer provided on which the guide grooves were formed to have the thickness of 40 nm. On the triphenyl amine tetramer, an $SiO_2$ protective film was formed with the thickness of 40 nm by a reactive sputtering method to have the second organic dye layer. The polycarbonate board on which the second recording layer is provided is bonded to the polycarbonate board on which the third recording layer dedicated for reproducing in such a way that a surface opposite to the surface on which the guide grooves of the second recording layer are formed is integrally bonded to a surface opposite to the surface on which the third recording layer dedicated for reproducing is formed by using an adhesive.

Then, on the $SiO_2$ protective film formed on the second organic dye layer forming the second recording layer, a polycarbonate sheet was bonded by using a pressure sensitive adhesive. At this time, the polycarbonate sheet was bonded on the protective film so that the total thickness of the polycarbonate sheet and the pressure sensitive adhesive was 100 μm.

The triphenyl amine tetramer forming the second organic dye layer used in this Example was the same as that used in the third Example. A refractive index relative to an optical beam having the wavelength of 650 nm was 1.65 in the second organic dye layer and an absorption coefficient was 0.

The optical recording medium formed as mentioned above was mounted on a disc player using an optical disc based on the standard of the DVD disc as a recording medium to carry out an experiment for reproducing data of the third recording layer dedicated for reproducing. As a result, an information signal such as a video signal recorded on the third recording layer dedicated for reproducing was reproduced without problem. When an area of the polycarbonate board having the second recording layer where the guide grooves were not formed was irradiated with laser beam having the wavelength of 650 nm from a signal reading surface side on which the second recording layer of the optical recording medium is formed to measure the reflectivity of the laser beam reflected from the area, the reflectivity was 83%. From these results, the second recording layer having the second organic dye layer is hardly sensed by an optical system using the optical beam having the wavelength of 650 nm based on the standard of the DVD disc and an aberration rarely remains. Therefore, the information signal such as the video signal recorded on the third recording layer dedicated for reproducing can be reproduced with good reproducing characteristics by an optical pick-up using the optical beam having the wavelength of 650 nm based on the standard of the DVD disc.

Then, when an experiment for recording and reproducing data on the second recording layer, the results substantially the same as those of the third Example were obtained. Consequently, according to this Example, an optical disc having both the second recording layer with the second organic dye layer using the optical beam having the short wavelength of 380 nm to 450 nm for recording and reproducing data and the third recording layer dedicated for reproducing based on the standard of the DVD disc could be apparently realized.

FIFTH EXAMPLE

An optical recording medium according to a fifth Example corresponds to the optical recording medium shown in FIG. 8. The optical recording medium has a first recording layer for recording and reproducing data based on the standard of the DVD disc in place of the third recording layer dedicated for reproducing of the fourth Example.

A procedure for manufacturing this optical recording medium is substantially the same as that of the fourth Example. A first organic dye layer of the first recording layer and its thickness are the same as those of the first Example. In this Example, an aluminum reflecting film is formed with the thickness of 50 nm on guide grooves forming the first recording layer by a sputtering method and a protective film is not formed. The guide grooves forming the first recording layer were based on the standard of the DVD-R disc.

When the optical recording medium formed as described above was mounted on a disc player using an optical disc based on the standard of the DVD-R disc as a recording medium to carry out an experiment for recording and reproducing data on the first recording layer, an ordinary video signal could be recorded and reproduced with no problem.

Further, when an experiment for recording and reproducing data on a second recording layer, the results substantially the same as those of the third and fourth Examples were obtained. Therefore, the second recording layer had no absorption relative to an optical beam having the wavelength of 650 nm used for recording and reproducing data on the optical disc based on the standard of the DVD disc. Accordingly, the second recording layer apparently gave no influence to the recording and reproducing of data on the first recording layer based on the standard of the DVD disc.

SIXTH EXAMPLE

An optical recording medium according to a sixth Example corresponds to the optical recording medium shown in FIG. 9. The optical recording medium includes a second recording layer having a second organic dye layer using an optical beam having the short wavelength of 380 nm to 450 nm for recording and reproducing data, a first recording layer based on the standard of the DVD disc, and a second recording layer dedicated for reproducing.

A procedure for manufacturing the optical recording medium is substantially the same as that of the fourth Example. Initially, the second recording layer dedicated for reproducing and a protective layer made of an ultraviolet curing resin were formed on the polycarbonate board having the thickness of 0.6 mm like the first Example. On the other hand, the first recording layer was formed on a polycarbonate board having the thickness of 0.3 mm in the same manner as that of the first Example. The polycarbonate board on which the first recording layer is formed is bonded to the polycarbonate board on which the second recording layer dedicated for reproducing is formed in such a way that a surface opposite to the surface on which the first recording layer is formed is bonded to a surface opposite to the surface on which and the second recording layer dedicated for reproducing is formed, and they are integrally formed by an adhesive. A manufacturing procedure after the above-described procedure is the same as that of the fourth Example.

The optical recording medium formed as mentioned above was mounted on a disc player using an optical disc based on the standard of the CD disc as a recording medium to reproduce an information signal such as an audio signal recorded on the second recording layer dedicated for reproducing, the information signal could be reproduced with no problem.

When this optical recording medium was irradiated with a laser beam having the wavelength of 780 nm to measure the reflectivity of the laser beam reflected from the second recording layer dedicated for reproducing, the reflectivity was 73%. The transmittances of the second recording layer and the first recording layer relative to the laser beam having the wavelength of 780 nm are found to be apparently high. The transmittances of the laser beam having the wavelength of 780 nm on the second recording layer and the first recording layer are at least 90% or higher.

Subsequently, when an experiment for recording and reproducing data on the first recording layer was performed in the same manner as that of the first Example by using an optical pick-up having a light source for emitting an optical beam having the wavelength of 650 nm, the substantially same results were likewise obtained. Further, when an experiment for recording and reproducing data on the second recording layer was carried out, the results substantially the same as those of the third, fourth and fifth Examples were obtained.

As described above, it is recognized that the organic dye layers are used in the first recording layer and the second recording layer, and accordingly an optical beam is hardly detected in other parts than the respective layers for a light source used for recording and reproducing data on the layers respectively, a transmittance is very high, an aberration rarely remains and a good recording and reproducing can be carried out.

It is obvious to a person with ordinary skill in the art that the present invention is not limited to the above embodiments explained with reference to the drawings and various changes, substitutions or equivalence thereto can be made without departing the attached claims and the gist thereof.

INDUSTRIAL APPLICABILITY

As described above, the optical recording medium can be formed without providing the metallic reflecting film on the recording layer having the organic dye layer. Thus, the optical recording medium includes a plurality of kinds of recording layers in which the wavelengths of an optical beam for recording and/or reproducing information may be mutually different with high utility.

The invention claimed is:

1. An optical recording medium comprising:
a first light transmitting layer;
a layer of organic dye configured to have data recorded and read by an optical beam of a first wavelength incident through the first light transmitting layer and to transmit an optical beam of a second wavelength incident through the first light transmitting layer, the layer of organic dye, before recording, has a refractive index under the first wavelength of the optical beam having the first wavelength that is larger than the refractive index of the first light transmitting layer, and the refractive index under the first wavelength after recording is substantially the same as the refractive index of the first light transmitting layer;
a second light transmitting layer configured to transmit the optical beam of the second wavelength incident through the layer of organic dye; and
a reflecting layer configured to reflect the optical beam of the second wavelength incident through the second light transmitting layer.

2. The optical recording medium according to claim 1, wherein a reflectivity generated in an interface of the layer of organic dye and the first light transmitting layer is 10% or higher.

3. The optical recording medium according to claim 1, wherein the layer of organic dye has a refractive index under a laser of the second wavelength that is substantially the same as the refractive index of the first light transmitting layer, before and after recording.

4. The optical recording medium according to claim 1, wherein an irregular pattern of pits is formed on a plane opposite to a plane of incidence of the optical beam of the second wavelength of the second light transmitting layer, and
the reflecting layer is configured to cover the irregular pattern.

5. The optical recording medium according to claim 1, wherein the optical recording medium further comprises:
a protective layer between the layer of organic dye and the second light transmitting layer.

6. The optical recording medium according to claim 5, wherein the protective layer includes at least two layers made of an inorganic material.

7. The optical recording medium according to claim 6, wherein the protective layer is bonded to a plane side of the second light transmitting layer on which the optical beam of the second wavelength is incident.

8. The optical recording medium according to claim 1, wherein the optical recording medium includes a protective layer provided in the plane side of incidence of the optical beam of the first wavelength of the layer of organic dye to protect the layer of organic dye, and an adhesive layer provided between the protective layer and the first transmitting layer.

9. The optical recording medium according to claim 8, wherein the optical recording medium further includes a light transmitting layer having one surface on which the layer of organic dye is provided and the other surface bonded to the second light transmitting layer.

10. The optical recording medium according to claim 9, wherein the optical recording medium further comprises a layer on which data is recorded and read by other optical beams having different wavelengths from the first wavelength and the second wavelength incident through the first light transmitting layer, and which has an organic dye for transmitting the optical beam of the second wavelength incident through the first light transmitting layer.

11. The optical recording medium according to claim 1, wherein the optical recording medium further comprises a layer of organic dye between the reflecting layer and the second light transmitting layer, and the data is recorded and read by the optical beam of the second wavelength on the layer of organic dye.

12. The optical recording medium according to claim 1, wherein the reflecting layer is made of a metallic material.

13. The optical recording medium according to claim 12, wherein the optical recording medium further comprises:
a layer configured to cover the reflecting layer.

14. The optical recording medium according to claim 1, wherein the first wavelength is 635 nm to 660 nm, and the second wavelength is 770 nm to 830 nm.

15. The optical recording medium according to claim 14, wherein the layer of organic dye is located at a position spaced by 0.550 mm to 0.653 mm from a plane of incidence of the optical beam of the first wavelength and the optical beam of the second wavelength of the first light transmitting layer, and
the reflecting layer is located at a position spaced by 1.10 mm to 1.40 mm from the plane of incidence of the optical beam of the first wavelength and the optical beam of the second wavelength of the first light transmitting layer.

16. The optical recording medium according to claim 1, wherein the first wavelength is 380 nm to 450 nm, and the second wavelength is 770 nm to 830 nm.

17. The optical recording medium according to claim 16, wherein the layer of organic dye is located at a position spaced by 80 µm to 120 µm from the plane of incidence of the optical beam of the first wavelength and the optical beam of the second wavelength of the first light transmitting layer, and the reflecting layer is located at a position spaced by 1.10 mm to 1.40 mm from the plane of incidence of the optical beam of the first wavelength and the optical beam of the second wavelength of the first light transmitting layer.

18. The optical recording medium according to claim 1, wherein the first wavelength is 380 nm to 450 nm, and the second wavelength is 635 nm to 660 nm.

19. The optical recording medium according to claim 18, wherein the layer of organic dye is located at a position spaced by 80 µm to 120 µm from the plane of incidence of the optical beam of the first wavelength and the optical beam of the second wavelength of the first light transmitting layer, and the reflecting layer is located at a position spaced by 0.550 mm to 0.653 mm from the plane of incidence of the optical beam of the first wavelength and the optical beam of the second wavelength of the first light transmitting layer.

20. An optical recording medium, comprising:
a first light transmitting layer;
a recording layer on which data is recorded and read by an optical beam of a first wavelength incident through the first light transmitting layer, configured to transmit an optical beam of a second wavelength incident through the first light transmitting layer, and having a refractive index under the first wavelength of the optical beam, before recording, that is larger than the refractive index of the first light transmitting layer, and a refractive index under the first wavelength after recording that is substantially the same as the refractive index of the first light transmitting layer;
a second light transmitting layer configured to transmit the optical beam of the second wavelength incident through the recording layer; and
a reflecting layer configured to reflect the optical beam of the second wavelength incident through the second light transmitting layer.

21. The optical recording medium according to claim 20, wherein a reflectivity generated in an interface of the recording layer and the first light transmitting layer is 10% or higher.

22. The optical recording medium according to claim 20, wherein the recording layer has a refractive index on the optical beam of the second wavelength that is substantially the same as the refractive index of the first light transmitting layer, before and after recording.

23. The optical recording medium according to claim 20, wherein an irregular pattern of pits is formed on a plane opposite to a plane of incidence of the optical beam of the second wavelength of the second light transmitting layer, and
the reflecting layer is configured to cover the irregular pattern.

24. The optical recording medium according to claim 20, wherein the optical recording medium further comprises:
a protective layer between the recording layer and the second light transmitting layer.

25. The optical recording medium according to claim 24, wherein the protective layer includes at least two layers made of an inorganic material.

26. The optical recording medium according to claim 25, wherein the protective layer is bonded to a plane side of the second light transmitting layer on which the optical beam of the second wavelength is incident.

27. The optical recording medium according to claim 20, wherein the optical recording medium includes a protective layer provided in the plane side of incidence of the optical beam of the first wavelength of the protective layer to protect the recording layer, and an adhesive layer provided between the protective layer and the first transmitting layer.

28. The optical recording medium according to claim 27, wherein the optical recording medium further comprises a light transmitting layer having one surface on which the recording layer is provided and the other surface bonded to the second light transmitting layer.

29. The optical recording medium according to claim 28, wherein the optical recording medium further comprises a recording layer on which data is recorded and read by other optical beams having different wavelengths from the first wavelength and the second wavelength incident through the first light transmitting layer, and which transmits the optical beam of the second wavelength incident through the first light transmitting layer.

30. The optical recording medium according to claim 20, wherein the optical recording medium further comprises a recording layer between the reflecting layer and the second light transmitting layer, and the data is recorded and read by the optical beam of the second wavelength on the recording layer.

31. The optical recording medium according to claim 20, wherein the reflecting layer is made of a metallic material.

32. The optical recording medium according to claim 31, wherein the optical recording medium further comprises:
a layer configured to cover the reflecting layer.

33. The optical recording medium according to claim 20, wherein the first wavelength is 635 nm to 660 nm, and the second wavelength is 770 nm to 830 nm.

34. The optical recording medium according to claim 32, wherein the recording layer is located at a position spaced by 0.550 mm to 0.653 mm from a plane of incidence of the optical beam of the first wavelength and the optical beam of the second wavelength of the first light transmitting layer, and
the reflecting layer is located at a position spaced by 1.10 mm to 1.40 mm from the plane of incidence of the optical beam of the first wavelength and the optical beam of the second wavelength of the first light transmitting layer.

35. The optical recording medium according to claim 20, wherein the first wavelength is 380 nm to 450 nm, and the second wavelength is 770 nm to 830 nm.

36. The optical recording medium according to claim 33, wherein the recording layer is located at a position spaced by 80 µm to 120 µm from the plane of incidence of the optical beam of the first wavelength and the optical beam of the second wavelength of the first light transmitting layer, and the reflecting layer is located at a position spaced by 1.10 mm to 1.40 mm from the plane of incidence of the optical beam of the first wavelength and the optical beam of the second wavelength of the first light transmitting layer.

37. The optical recording medium according to claim 20, wherein the first wavelength is 380 nm to 450 nm, and the second wavelength is 635 nm to 660 nm.

38. The optical recording medium according to claim 35, wherein the recording layer is located at a position spaced by 80 µm to 120 µm from the plane of incidence of the optical beam of the first wavelength and the optical beam of the second wavelength of the first light transmitting layer, and the reflecting layer is located at a position spaced by 0.550 mm to 0.653 mm from the plane of incidence of the optical beam of the first wavelength and the optical beam of the second wavelength of the first light transmitting layer.

39. The optical recording medium according to claim 1, wherein the refractive index under the first wavelength before recording is about 2.5, and the refractive index under the first wavelength after recording is about 1.5.

40. The optical recording medium according to claim 20, wherein the refractive index under the first wavelength before recording is about 2.5, and the refractive index under the first wavelength after recording is about 1.5.

* * * * *